(12) United States Patent
Eshima McKay et al.

(10) Patent No.: US 12,507,891 B2
(45) Date of Patent: Dec. 30, 2025

(54) DETERMINING THE RISK OF OPIOID-RELATED ADVERSE EVENTS BASED ON PUPILLARY MEASUREMENTS

(71) Applicant: The Regents of the University of California, Oakland, CA (US)

(72) Inventors: Rachel Eshima McKay, San Francisco, CA (US); Merlin D. Larson, San Francisco, CA (US)

(73) Assignee: The Regents of the University of California, Oakland, CA (US)

( * ) Notice: Subject to any disclaimer, the term of this patent is extended or adjusted under 35 U.S.C. 154(b) by 764 days.

(21) Appl. No.: 17/759,130

(22) PCT Filed: Jan. 22, 2021

(86) PCT No.: PCT/US2021/014710
§ 371 (c)(1),
(2) Date: Jul. 20, 2022

(87) PCT Pub. No.: WO2021/150956
PCT Pub. Date: Jul. 29, 2021

(65) Prior Publication Data
US 2023/0053166 A1  Feb. 16, 2023

Related U.S. Application Data

(60) Provisional application No. 62/965,050, filed on Jan. 23, 2020.

(51) Int. Cl.
*A61B 3/00* (2006.01)
*A61B 3/11* (2006.01)
(Continued)

(52) U.S. Cl.
CPC .............. *A61B 3/145* (2013.01); *A61B 3/112* (2013.01); *A61B 5/0004* (2013.01);
(Continued)

(58) Field of Classification Search
CPC ..... A61B 3/112; A61B 5/4845; A61B 5/7257; A61B 5/7275; A61B 2560/0431;
(Continued)

(56) References Cited

U.S. PATENT DOCUMENTS

2015/0116665 A1   4/2015  Finkel
2016/0192837 A1*  7/2016  Neice ..................... A61B 3/145
                                                        351/206
(Continued)

OTHER PUBLICATIONS

McKay et al., (2021) Detection of opioid effect with pupillometry, Autonomic Neuroscience: Basic and Clinical, pp. 1-8.
(Continued)

*Primary Examiner* — Kent Yip
(74) *Attorney, Agent, or Firm* — Edward J. Baba; Michael J. Blessent; Bozicevic, Field & Francis LLP

(57) ABSTRACT

The disclosure provides methods of managing opioid therapy, particularly, for pain management. The methods comprise determining in a subject, for example, a subject who has received an opioid treatment, pupillary unrest in ambient light (PUAL). Low values of PUAL can be used to identify patients at risk for opioid side-effects, such as opioid-related respiratory depression (OIRD), and who warrant attention to prevent such side effects. Accordingly, the methods include monitoring the patients having low values of PUAL for signs of adverse side-effects and/or limiting or avoiding administration of opioids.

23 Claims, 18 Drawing Sheets

(51) Int. Cl.
- A61B 3/14 (2006.01)
- A61B 5/00 (2006.01)
- G01J 5/10 (2006.01)
- G01J 5/00 (2022.01)

(52) U.S. Cl.
CPC .......... *A61B 5/4845* (2013.01); *A61B 5/7257* (2013.01); *A61B 5/7275* (2013.01); *G01J 5/10* (2013.01); *A61B 2560/0431* (2013.01); *G01J 2005/0077* (2013.01)

(58) Field of Classification Search
CPC ..... A61B 5/004; A61B 5/4836; A61B 5/6898; A61B 3/14; A61B 3/11
See application file for complete search history.

(56) References Cited

U.S. PATENT DOCUMENTS

| | | |
|---|---|---|
| 2016/0192838 A1 | 7/2016 | Hirsh |
| 2016/0235295 A1 | 8/2016 | Sadhasivam |
| 2017/0100061 A1 | 4/2017 | Finkel |

OTHER PUBLICATIONS

McKay et al., (2022) Pupillary unrest, opioid intensity, and the impact of environmental stimulation on respiratory depression, Journal of Clinical Monitoring and Computing, 36: pp. 473-482.
Behrends et al. (2019) "Suppression of pupillary unrest by general anesthesia and propofol sedation," J Clin Monit Comput, 33(2): 317-323.
Bokoch et al. (2015) "Fentanyl, an agonist at the mu opioid receptor, depresses pupillary unrest," Auton Neurosci, 189: 68-74.
Borghjerg et al. (1996) "Experimental pain stimulates respiration and attenuates morphine-induced respiratory depression: a controlled study in human volunteers," Pain, 64(1): 123-128.
Centers for Disease Control and Prevention (2018) "Drug overdose rates, by drug type, sex, age, race, and Hispanic origin: United States, selected years 1999-2017." Retrieved Oct. 10, 2022 from world-wide-website: cdc.gov/nchs/data/hus/2018/008.pdf.
Charier et al. (2019) "Assessing pain in the postoperative period: Analgesia Nociception Index(TM) versus pupillometry," British Journal of Anaesthesia, 123(2): e322-e327.
Danovitch et al. (2020) "Opioid overdose in the Hospital Setting: A Systematic Review," J Addict Med, 14(1): 39-47.
Egan et al. (1993) "The Pharmacokinetics of the New Short-acting Opioid Remifentanil (G187084B) in Healthy Adult Male Volunteers," Anesthesiology, 79(5): 881-892.
Hanks et al. (1981) "Unexpected complication of successful nerve block. Morphine induced respiratory depression precipitated by removal of severe pain," Anaesthesia, 36(1): 37-39.
Janneto et al. (2010) "Pharmacogenomic considerations in the opioid management of pain," Genomic Medicine, 2 (66): 1-4.
Joshi et al. (2016) "Relationships Between Pupil Diameter and Neuronal Activity in the Locus Coeruleus, Colliculi, and Cingulate Cortex," Neuron, 89(1): 221-234.
Khanna et al. (2019) "Automated continuous noninvasive ward monitoring: future directions and challenges," Critical Care, 23(1): 194-199.
Kharasch et al. (2003) "Disposition and miotic effects of oral alfentanil: A potential noninvasive probe for first-pass cytochrome P4503A activity," Clin Pharmacol Ther, 73(3): 199-208.
Kobelt et al. (2014) "Evaluation of standardized sedation assessment for opioid administration in the post anesthesia care unit," Pain Manag Nurs, 15(3): 672-681.
Lang et al. (1996) "Reduction of Isoflurane Minimal Alveolar Concentration by Remifentanil," Anesthesiology, 85(4): 721-728.
Larson, M. (2008) "Mechanism of opioid-induced pupillary effects," Clin Neurophysiol, 119(6): 1358-1364.
Lee et al. (2015) "Postoperative Opioid-Induced Respiratory Depression: A Closed Claims Analysis," Anesthesiology, 122(3): 659-665.
Lentschener et al. (2007) "Opioid-Induced Sensation in the Postanesthesia Care Unit Does Not Insure Adequate Pain Relief: A Case-Control Study," Anesth Analg, 105(4): 1143-1147.
Marateb et al. (2014) "Manipulating measurement scales in medical statistical analysis and data mining: A review of methodologies," J Res Med Sci, 19(1): 47-56.
McKay et al. (2018) "Pupillary Unrest in Ambient Light and Prediction of Opioid Responsiveness: Case Report on its Utility in the Management of 2 Patients With Challenging Acute Pain Conditions," Anesth Analg Practice, 10(10): 279-282.
Minto et al. (1997) "Pharmacokinetics and Pharmacodynamics of Remifentanil: II. Model Application," Anesthesiology, 86(1): 24-33.
Montana et al. (2019) "Opioid Sensitivity in Children with and without Obstructive Sleep Apnea," Anesthesiology, 130(6): 936-945.
Murray et al. (1983) "The Pupillary Effects of Opioids," Life Sci, 33(6): 495-509.
Neice et al. (2017) "Prediction of Opioid Analgesic Efficacy by Measurement of Pupillary Unrest," Anesth Analg, 124 (3): 915-921.
Olofsen et al. (2010) "Modeling the Non-Steady State Respiratory Effects of Remifentanil in Awake and Propofol-sedated Healthy Volunteers," Anesthesiology, 112(6): 1382-1395.
Overdyk et al. (2016) "Association of Opioids and Sedatives with Increased Risk of In-Hospital Cardiopulmonary Arrest from an Administrative Database," PLoS One, 11(2): 1-13.
Rollins et al. (2014) "Pupillary Effects of High-dose Opioid Quantified with Infrared Pupillometry," Anesthesiology, 121(5): 1037-1044.
Smith et al. (1970) "Single neuron activity in the pupillary system," Brain Research, 24(2): 219-234.
Stark, L. (1969) "Pupillary control system: its nonlinear adaptive and stochastic engineering design characteristics," Fed Proc, 28(1): 52-64.
Turnbull et al. (2017) "Origins of Pupillary Hippus in the Autonomic Nervous System," Invest Ophthalmol Vis Sci, 58(1): 197-203.
University of California, San Francisco (2020) "Pupillary Unrest in Ambient Light, and Relationship to Opioid-Induced Respiratory Depression," U.S. National Library of Medicine. Retrieved Oct. 11, 2022 from world-wide-website: https://clinicaltrials.gov/ct2/show/NCT04301895?term=nct04301895&draw=2&rank=1.
Usui et al. (1982) "A model for nonlinear stochastic behavior of the pupil," Biol Cybern, 45(1): 13-21.
Wilhelm et al. (2001) "Daytime variations in central nervous system activation measured by a pupillographic sleepiness test," J Sleep Res, 10(1): 1-7.

\* cited by examiner

DETERMINING THE RISK OF OPIOID-RELATED ADVERSE EVENTS BASED ON PUPILLARY MEASUREMENTS Over the past two decades, alarming trends in opioid-related adverse events have come to the attention of the medical community and the general public. Age-adjusted opioid overdose rates have risen from 3.0 to 14.9 events per 100,000 people between years 2000 to 2017, surpassing motor vehicles accidents and firearms as causes of accidental deaths in the United States. Although the majority of overdoses occur in the community, cases of fatal opioid overdose among hospitalized patients continue to be reported, with iatrogenic respiratory arrest from opioid mismanagement cited as a significant source of preventable harm. A recent administrative database review examining cases of opioid-induced cardiopulmonary arrest showed that approximately half of these incidents occurred while patients were in the intensive care unit, presumably while frequent clinical assessments and continuous standard monitoring were taking place. Iatrogenic opioid-related respiratory depression (OIRD) carries severe liability; a Closed Claim Analysis published in 2015 showed that among reported cases of respiratory depression, more than 75% resulted in death or serious brain injury, one third occurred during continuous pulse oximetry monitoring, and 16% occurred no more than 15 minutes after an uneventful nursing check. While the combined incidence of both fatal and non-fatal cases of opioid-related respiratory depression (OIRD) is unknown, these reports underscore its sporadic onset and highly variable identifying features. However, OIRD can be difficult to recognize and predict. Without effective tools to quantitatively measure opioid effect, clinicians managing patients with acute pain may fail to recognize concealed OIRD and continue to be relegated to subjective, non-specific, and often contradictory data to support clinical decision-making.

Data from existing technologies, including measuring respiratory rate, $CO_2$, sedation scales, and $SpO_2$, may be used to identify opioid effects, but these measurements reflect conditions that are non-specific to opioids. The brainstem and mid-brain are principal sites of action for opioids, where they reflect their effects on ventilatory depression. A practical method to examine the brainstem or pupil precisely to assess the impact of opioids is not available. In hospitalized patients, the available methods of assessing opioid effects are imprecise and insensitive. With standard levels of monitoring, surrogate findings are loosely or completely unrelated to opioid site of action, and these assessments only occur at infrequent intervals (typically every 4-8 hours).

During these periodic assessments, one partially related measure is the ventilatory rate, a putative indicator of opioid-induced reduction of ventilatory drive. However, many have observed that ventilatory rate is an insensitive measure of opioid intoxication, where ventilatory rates were often maintained within normative ranges seconds before onset of respiratory arrest.

Clinicians document opioid-related sedation scales such as POSS (Pasero-Opioid Sedation Scale). Metrics on scales such as POSS are extremely non-specific, since factors such as fluctuating changes in levels of stimulation within the environment (i.e., from clinical assessments, conversation, and pain) and delirium can confound these results. Since pure somnolence in a hospitalized patient can be caused by a variety of conditions, including opioid intoxication, but without decision-support tools to support or exclude a specific cause, findings are not actionable, and clinical interventions are delayed. Of concern are the number of cases in which OIRD was reported to be "completely unforeseeable" on the part of caregivers.

In hospitalized patients who have been triaged to receive a higher-level care, continuous vital sign monitoring, specifically use of continuous oxyhemoglobin saturation (CPO), occasionally in combination with $CO_2$, are employed. These measures are thought to improve the clinician's ability to detect OIRD compared to use of sedation scales alone, but still there is significant incidence of OIRD in patients who receive such continuous monitoring—a recent report citing 50% occurred while patients were monitored continuously. There are expensive initiatives currently underway to attempt complex remote monitoring, and aggregation of vast amounts of data to predict OIRD. These efforts will be expensive and again, reliant upon insensitive data. Many of the subjects who proceeded to respiratory arrest did so within seconds of vital signs ($CO_2$, $SpO_2$, and respiratory rates) that would not have activated monitor alarms or raised clinical suspicion, underscoring the inconsistency of these measures. Therefore, an ultra-rapid response time (seconds) is required for intervention to prevent hypoxia as a patient develops respiratory depression to the point of apnea.

Some investigators have recently advocated use of alternative pupillary measurements as indicators of opioid effect, such as pupillary light reflex and constriction velocity. Collectively these are referred to as excitatory measures, since they are produced in response to visible light stimulation. Not only are these measures non-specific, never having been proven to indicate opioid effect, they are interval scales, lacking a definitive lower-limiting boundary. Pupil diameter has likewise been proposed as a measure of opioid effect. This measurement likewise has the limitation of lack of an objective zero value, and the presence of numerous medications, clinical conditions and individual variability that makes this measurement impractical.

Therefore, accurate and sensitive variables that can also be easily measured are desirable in monitoring opioid effects and managing opioid treatments.

SUMMARY

The disclosure describes that specific pupillary characteristics can be used as indicators of opioid effects and to guide opioid administration in the treatment of acute and chronic pain in a safe and individualized manner. To that end, the disclosure identifies PUAL as an indicator of the risk of an opioid-related adverse event, such as OIRD.

Accordingly, certain embodiments of the invention provide a method of determining the risk of an opioid-related adverse event in a subject, by measuring PUAL in the subject. Such risk assessment can be based on the actual PUAL measurement, percent decline in PUAL measurement over baseline PUAL measurement, or Z-score for PUAL.

Certain embodiments of the invention also provide computer-implemented methods of determining PUAL in the subject and based on the PUAL, percent PUAL decline, or Z-score of PUAL in the subject, determining the risk of an opioid-related adverse event. The computer-implemented methods can further suggest an appropriate opioid therapy management in the subject based on the PUAL, percent PUAL decline, or Z-score of PUAL in the subject.

In specific embodiments, the computer-implemented methods are carried out using a portable electronic device, such as a smart-phone or a tablet. The smart-phone or a tablet is equipped with a software programmed to measure PUAL, percent PUAL decline, or Z-score of PUAL in a subject. On the portable electronic device, an adapter can be used to engage with a camera that detects infrared light, wherein the adapter can be placed on the eye of a subject to facilitate the software on the portable electronic device to measure PUAL, percent PUAL decline, or Z-score of PUAL in a subject. In preferred embodiments, the adapter is substantially cylindrical or cone shaped with one end designed to be connected or placed on to the camera of the portable electronic device and the other end designed to be placed on the eye of a subject. Accordingly, certain embodiments provide a portable electronic device having installed thereon a software programmed to measure PUAL, percent PUAL decline, or Z-score of PUAL in a subject, having an adapter engaged with the camera of the portable electronic device, and wherein, upon measuring PUAL, percent PUAL decline, or Z-score of PUAL in a subject, the software recommends opioid therapy management.

DETAILED DESCRIPTION

Figure 1:
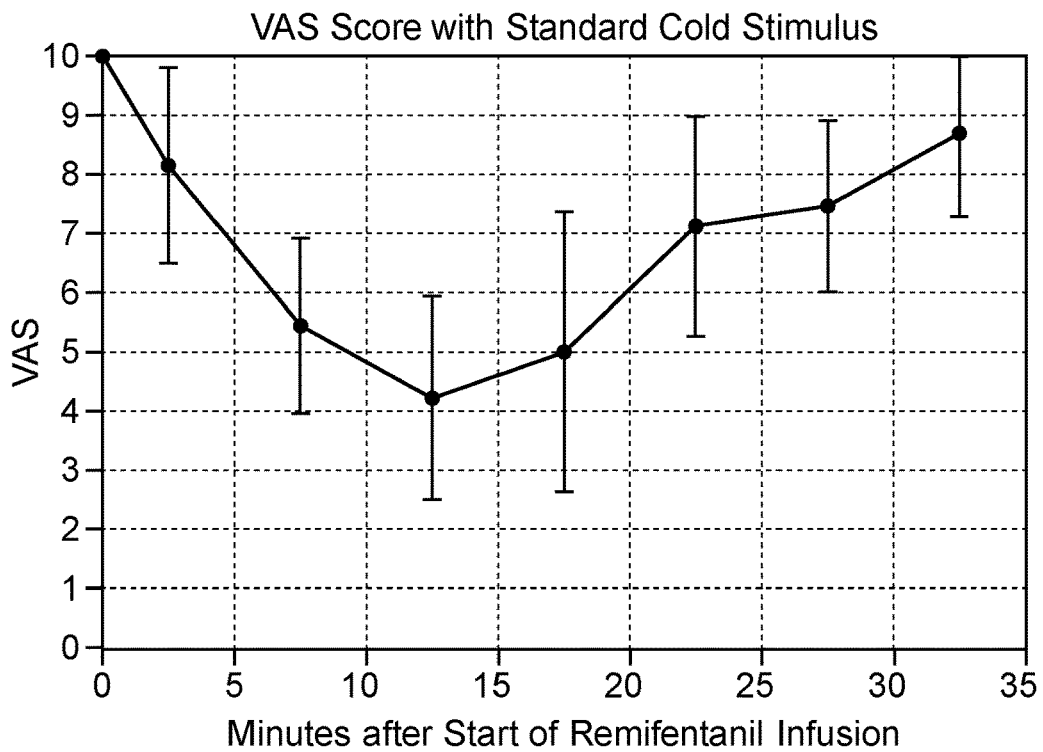
FIG. 1: Application of ice to the lower legs and forearms of volunteers during 10-minute remifentanil infusion and 25-minute recovery period demonstrated roughly 60% decline in visual analog scale (VAS) score at maximum opioid concentration.

Under static levels of ambient light, the normal human eye exhibits continuous, bilaterally synchronous pupil size fluctuation. Portable infrared pupillometers have recently become available that can visualize the pupil without the application of visible light. In conjunction with Fourier Transformation waveform analysis, these devices can measure pupillary unrest in ambient light (PUAL), the bilaterally synchronous, periodic fluctuations in pupil diameter that occurs normally in the human eye within characteristic frequency ranges under typical levels of indoor lighting. PUAL is abolished under general anesthesia, and in awake subjects, it is thought to be mediated by fluctuating activity in the parasympathetic Edinger Westphal nucleus, possibly driven indirectly by the locus coeruleus.

Opioid-related adverse events frequently occurred within a short period of time after withdrawal of stimulation, such as a nurse leaving the room, patient being transferred from busy to a quiet room, or effective regional block given after extensive opioid treatment. These events highlight the challenge in assessing depth of opioid exposure and risk of respiratory depression when the temporary supportive effect of the stimulating environment is withdrawn. This disclosure proposes PUAL as a parameter to identify a subject that may be suffering or will suffer from an opioid-related adverse event.

PUAL is expressed in arbitrary units (AU); additional details on the measurement are known in the art, for example, as described in Bokoch et al., Neice et al., Turnbull et al., McKay et al., and Wilhelm et al. When an alert subject is in a dark environment, or undergoes general anesthesia, these oscillatory movements are abolished. Preliminary studies have suggested that PUAL declines after opioid administration, although the consistency and limits of this relationship until now have not been systematically established or described. This disclosure provides that PUAL is clinically useful and describes thresholds indicating clinically significant opioid exposure. The disclosure provides that PUAL levels correlate with central opioid effect. The disclosure provides specific thresholds of PUAL decline that occur before a person becomes susceptible to an opioid-related adverse event, such as OIRD. PUAL decline can serve as an early indicator of a range of mild to profound risk of an opioid-related adverse event. Therefore, PUAL measurement can provide decision support that will benefit clinicians and caregivers who are responsible for the safety of patients given opioid medications, allowing a proactive approach that can recognize higher ranges of opioid concentration and avoidance of excess opioid administration. The system of monitoring PUAL and determining opioid levels disclosed herein is referenced herein as Opioid detection and stratification system (OPDESS).

OPDESS can be added to existing, commercially available pupillometers to enhance functionality and broaden the utility of these devices. According to OPDESS, in certain embodiments, PUAL is measured with an infrared camera within the pupillometer or a portable electronic device having an infrared camera and a software programmed to measure PUAL, percent PUAL decline, or Z-score of PUAL.

PUAL can also be measured using pupillometers that use visible light or through the closed eyelid with ultrasound to measure pupillary movements. Such pupillometers can also be equipped with a software programmed to measure PUAL, percent PUAL decline, or Z-score of PUAL.

PUAL, percent PUAL decline, or Z-score of PUAL is calculated based on a video of the pupil, particularly, about 5 to 20 second video of the pupil, preferably, about 10-second video of the pupil. After the video is obtained, the pupillometer or the portable electronic device can provide a score based on the PUAL, percent PUAL decline, or Z-score of PUAL measurement that indicates the risk of an opioid-related adverse event. For example, a score of 1 or 2 can indicate no risk of an opioid-related adverse event, a score of 3 or 4 can indicate moderate risk of an opioid-related adverse event, and a score of 5 or higher can indicate a high risk of an opioid-related adverse event. This score typically indicates level of opioid concentration or activity within the central nervous system of the subject. For example, score of 1=no discernable opioid effect, 2=mild/low opioid effect, 3=moderate opioid effect (additional opioid unlikely to improve analgesia), 4=significant/high opioid effect (consider intensification of clinical monitoring, consider limiting further opioid) and 5=profound opioid effect (curtail opioid use, consider transferring patient to a unit that provides continuous monitoring). Appropriate measures for each score, including consideration of intensification of clinical monitoring, or consideration of limiting or temporarily curtailing further opioid administration in high risk conditions, are described below.

The OPDESS can also be used in infrared pupillometers to assess outpatients who receive opioids chronically. A significant deviation in OPDESS score from an individual's baseline should raise suspicion for possible nonadherence to a pre-existing contract or agreement with the prescribing physician, e.g., a significant interval increase in the measurement could indicate that the patient is not actually using his/her prescriptions, or a significant decrease might indicate that the patient is receiving additional opioid from one or more additional sources.

OPDESS can be used in infrared pupillometers to assess patients with altered neurologic symptoms or deceased level-of-consciousness, to distinguish opioid intoxication from ischemic brain injury, increased intracranial pressure (ICP) or intoxication from non-opioid substances.

Moreover, OPDESS can be used by clinicians for patients undergoing treatment for polysubstance use disorder, where ongoing monitoring may be appropriate, and identification of opioid use is particularly important.

Further, OPDESS can be used in a pupillometer to screen pilots, long-distance drivers, and others in whom opioid intoxication may produce a safety hazard. Without the expense, time, and possibility of counterfeit results associated with laboratory testing, OPDESS could be measured repeatedly at the discretion of an employer or other individual with the responsibility of detecting opioid intoxication to protect individual and public safety.

Furthermore, OPDESS can be adapted for the purposes described above in a hand-held smart-phone application. An OPDESS adapter, for example, a dark rubber cone fitting over the camera of a phone (FIGS. 6-8) can be used to exclude stray ambient light and allow the infrared camera to make accurate measurements. OPDESS can also be adapted to wearable devices such as smart-glasses (GOOGLE GLASSES™), for example, by connecting through an OPDESS adapter.

The relationship between PUAL suppression, respiratory depression, and apnea was tested during a standardized remifentanil infusion in healthy volunteers exposed to two identical opioid infusion protocols that differed only by the level of stimulation within the environment. PUAL declined to near-zero values in both environments, but in the unstimulating environment, respiratory depression was more pronounced and that critical respiratory decline occurred at earlier time-points, corresponding to lower estimated opioid concentration, in each individual subject.

Accordingly, the disclosure provides that PUAL can be clinically used to indicate opioid effects, particularly, before an opioid-related adverse event takes place. Such information can be used to identify patients at the risk of an opioid-related adverse event, such as OIRD. A characteristic juncture of PUAL suppression can predict respiratory decline and apnea during persistence or incremental intensification of opioid treatment.

Before the methods, devices, and computer-readable media of the present disclosure are described in greater detail, it is to be understood that the methods, computer-readable media, and devices are not limited to the embodiments described, as such may, of course, vary. It is also to be understood that the terminology used herein is for the purpose of describing the embodiments only, and is not intended to be limiting, since the scope of the methods, computer-readable media, and devices will be limited only by the appended claims.

As used herein and in the appended claims, the singular forms "a," "an," and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements or use of a "negative" limitation.

Where a range of values is provided, it is understood that each intervening value, to the tenth of the unit of the lower limit unless the context clearly dictates otherwise, between the upper and lower limit of that range and any other stated or intervening value in that stated range, is encompassed. The upper and lower limits of these smaller ranges may independently be included in the smaller ranges and are also encompassed, subject to any specifically excluded limit in the stated range. Where the stated range includes one or both the limits, ranges excluding either or both of those included limits are also included.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which the methods, computer-readable media and devices belong. Although any methods, computer-readable media and devices similar or equivalent to those described herein can also be used in the practice or testing of the methods, computer-readable media and devices, representative illustrative methods, computer-readable media and devices are now described.

All publications and patents cited in this specification are herein incorporated by reference as if each individual publication or patent were specifically and individually indicated to be incorporated by reference and are incorporated herein by reference to disclose and describe the materials and/or methods in connection with which the publications are cited. The citation of any publication is for its disclosure prior to the filing date and should not be construed as an admission that the present methods, computer-readable media and devices are not entitled to antedate such publication, as the date of publication provided may be different from the actual publication date which may need to be independently confirmed.

It is appreciated that certain features of the methods, devices, and computer-readable media, which are, for clarity, described in the context of separate embodiments, may also be provided in combination in a single embodiment. Conversely, various features of the methods, computer-readable media and devices, which are, for brevity, described in the context of a single embodiment, may also be provided separately or in any suitable sub-combination. All combinations of the embodiments are specifically embraced by the present disclosure and are disclosed herein just as if each combination was individually and explicitly disclosed, to the extent that such combinations embrace operable processes and/or compositions. In addition, all sub-combinations listed in the embodiments describing such variables are also specifically embraced by the present methods, computer-readable media and devices and are disclosed herein just as if each such sub-combination was individually and explicitly disclosed herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present methods, computer-readable media, and devices. Any recited method can be carried out in the order of events recited or in any other order that is logically possible.

METHODS

Certain embodiments of the invention provide a method for determining in a subject the risk of an opioid-related adverse event, the method comprising:
(a) determining PUAL in the subject;
(b) obtaining one or more of: a no risk threshold value of PUAL, a low risk threshold value of PUAL, a moderate risk threshold value of PUAL, a high-risk threshold value of PUAL, and a profound risk threshold value of PUAL; and
(c) identifying the subject as having:
  i) no risk of the opioid-related adverse event if the PUAL in the subject is higher than the no risk threshold value of PUAL,
  ii) low risk of the opioid-related adverse event if the PUAL in the subject is higher than the low risk threshold value of PUAL but lower than the no risk threshold value of PUAL,
  iii) moderate risk of the opioid-related adverse event if the PUAL in the subject is higher than the moderate risk threshold value of PUAL but lower than the low risk threshold value of PUAL,
  iv) high risk of the opioid-related adverse event if the PUAL in the subject is higher than the high-risk threshold value of PUAL but lower than the moderate risk threshold value of PUAL, or
  v) profound risk of the opioid-related adverse event if the PUAL in the subject is lower than the profound risk threshold value of PUAL.

Different portable pupillometers use variable sample rates. For example, Neuroptics™ device measures at 30 Hz, whereas the Algiscan™ measures at 67 HZ and various smart phone applications vary from 30 to 60 Hz. To use the numbers that are listed in this disclosure, a correction factor would be required to make those numbers correlate with the data disclosed in this disclosure for use with other pupillometers such as Algiscan™ and the smartphone pupillometers that sample at slower rates. Therefore, in certain embodiments, instead of absolute values of PUAL, a percent decline from normal values could be used to determine in a subject the risk of an opioid-related adverse event. Accordingly, previous normal values of PUAL can facilitate the methods disclosed herein.

Accordingly, certain embodiments of the invention provide a method for determining in a subject the risk of an opioid-related adverse event, the method comprising:
(a) determining baseline PUAL and test PUAL in the subject;
(b) obtaining one or more of: a no risk threshold value of percent PUAL decline, a low risk threshold value of percent PUAL decline, a moderate risk threshold value of percent PUAL decline, a high-risk threshold value of percent PUAL decline, and a profound risk threshold value of percent PUAL decline; and
(c) identifying the subject as having:
  i) no risk of the opioid-related adverse event if the percent PUAL decline in the subject is lower than the no risk threshold value of percent PUAL decline,
  ii) low risk of the opioid-related adverse event if the percent PUAL decline in the subject is lower than the low risk threshold value of percent PUAL decline but higher than the no risk threshold value of percent PUAL decline,
  iii) moderate risk of the opioid-related adverse event if the percent PUAL decline in the subject is lower than the moderate risk threshold value of percent PUAL decline but higher than the low risk threshold value of percent PUAL decline,
  iv) high risk of the opioid-related adverse event if the percent PUAL decline in the subject is lower than the high-risk threshold value of percent PUAL decline but higher than the moderate risk threshold value of percent PUAL decline, or
  v) profound risk of the opioid-related adverse event if the percent PUAL decline in the subject is higher than the profound risk threshold value of percent PUAL decline.

Percent PUAL decline denotes the percent of decline in the test PUAL as compared to the baseline PUAL.

Additional embodiments of the invention provide a method for determining in a subject the risk of an opioid-related adverse event, the method comprising:
(a) determining Z-score for PUAL in the subject;
(b) obtaining one or more of: a no risk threshold value of Z-score for PUAL, a low risk threshold value of Z-score for PUAL, a moderate risk threshold value of Z-score for PUAL, a high-risk threshold value of Z-score for PUAL, and a profound risk threshold value of Z-score for PUAL; and
(c) identifying the subject as having:
  i) no risk of the opioid-related adverse event if the Z-score for PUAL in the subject is higher than the no risk threshold value of Z-score for PUAL,
  ii) low risk of the opioid-related adverse event if the Z-score for PUAL in the subject is higher than the low risk threshold value of Z-score for PUAL but lower than the no risk threshold value of Z-score for PUAL,
  iii) moderate risk of the opioid-related adverse event if the Z-score for PUAL in the subject is higher than the moderate risk threshold value of Z-score for PUAL but lower than the low risk threshold value of Z-score for PUAL,
  iv) high risk of the opioid-related adverse event if the Z-score for PUAL in the subject is higher than the high-risk threshold value of Z-score for PUAL but lower than the moderate risk threshold value of Z-score for PUAL, or
  v) profound risk of the opioid-related adverse event if the Z-score for PUAL in the subject is lower than the profound risk threshold value of Z-score for PUAL.

Z-score can be determined based on the following formula, where x is observed value, $\mu$ is mean of the sample, and $\sigma$ is standard deviation of the sample.

$$Z \text{ value} = (\chi - \mu)/\sigma$$

In some embodiments, $\mu$ for PUAL is 0.26 and $\sigma$ is 0.10.

Figure 20:
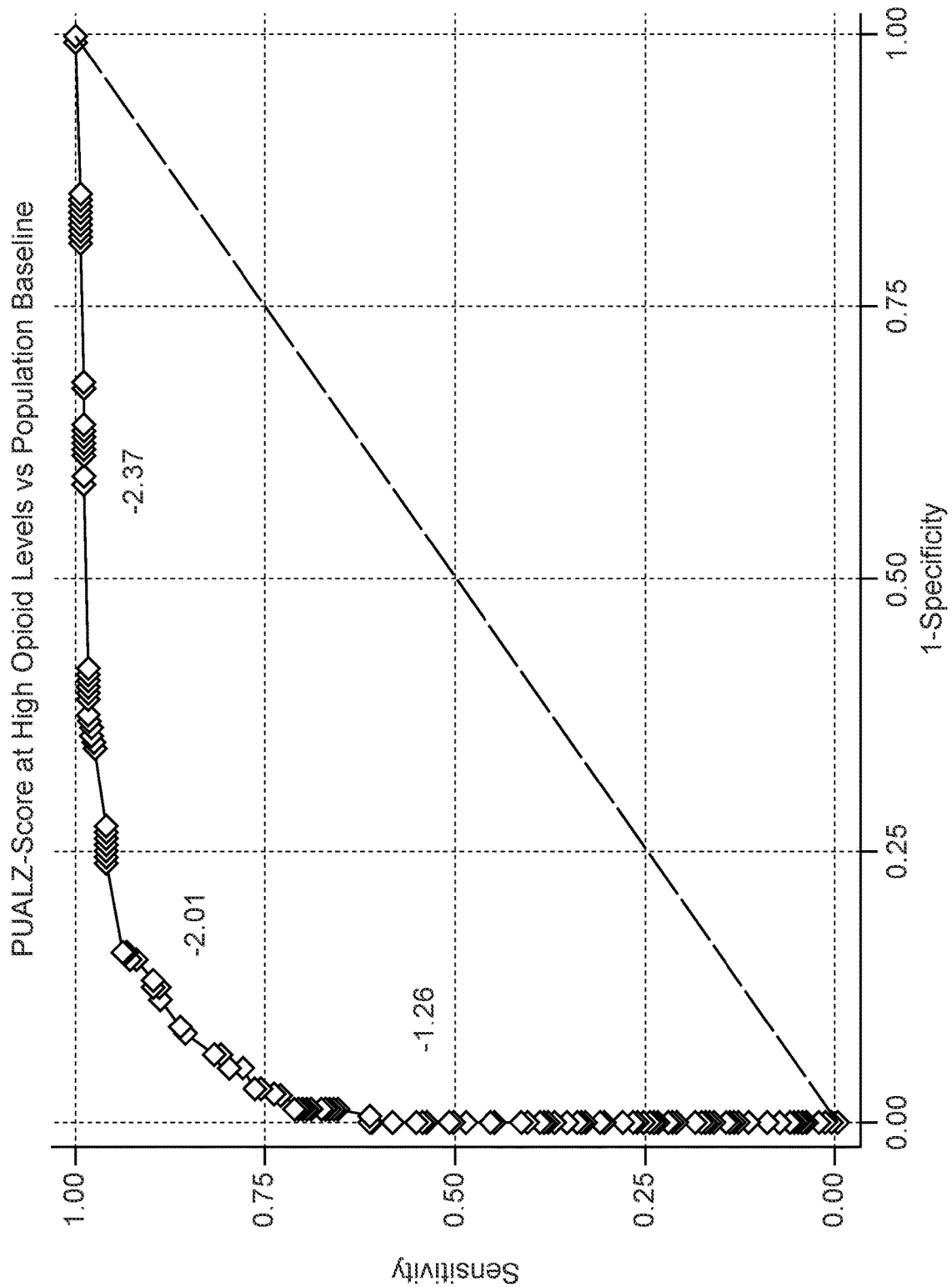
FIG. 20: Z-score with baseline PUAL of 0.26±0.10. Low risk: baseline, and 2.5, 20, 22.5, and 25 minutes after infusion start. High risk: 5, 7.5, 10, and 12.5 min after start of infusion. Risk of OIRD highest when the Z-score is less than −2.37 (+LR=38.75). Risk of OIRD is high when the Z-score is −1*(2.01-2.36) (+LR=3.22). Risk of OIRD is indeterminant when the Z-score is −1*(1.26-2.00) (+LR=0.40). Risk of OIRD is low when the Z-score is −1.26 (+LR=0.40).
Figure 21:
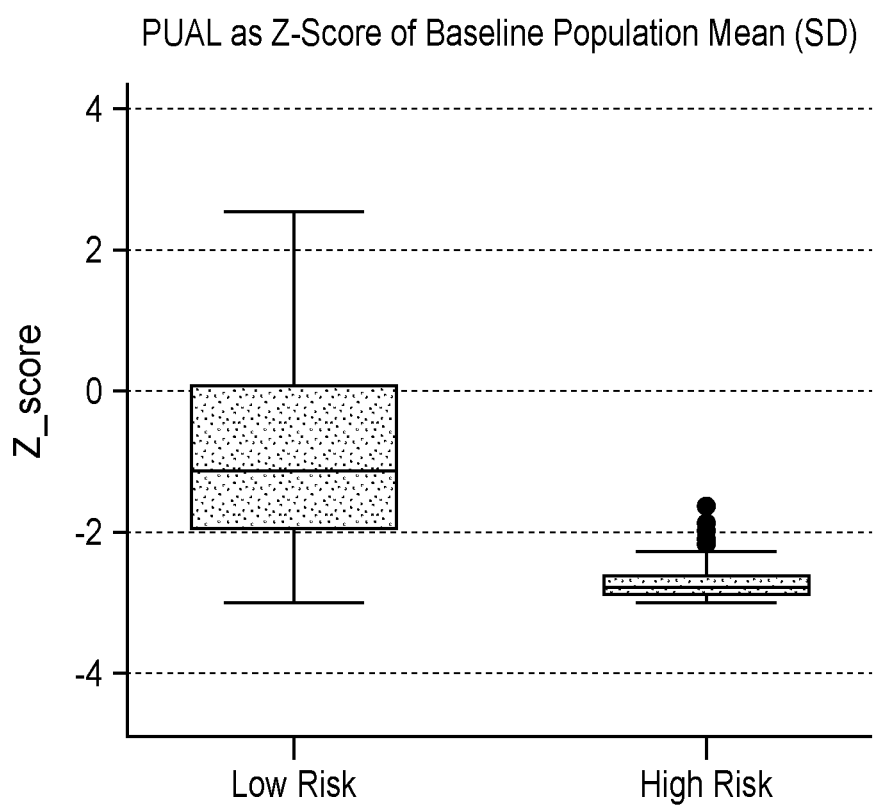
FIG. 21: The relationship between PUAL Z-score and High-Dose Opioid Effect, Odds ratio=152.9485, P<0.001.

FIG. 20 describes the correlation between the Z-scores for PUAL at high opioid levels as compared to population baseline determined from the population's mean and standard deviation. Similar to proportional decline, Z-scores for PUAL would also be valid even if various technical aspects of the PUAL measurement and calculation were to change. An advantage of the Z-score versus the percent decline is that the Z-score does not require a baseline reference. The Z-score can be useful in the Emergency Department or in situations where an individual requires one-time screening or rapid assessment (for example, for altered mental status or drug screening). As pupillometry techniques evolve, a conversion factor could be constructed. Furthermore, the scale could be refined to include a broader range of ages and patients with specific risk factors (severe diabetes).

PUAL can be calculated based on a 5 to 20 second video, preferably, a 10-second video, of the pupil. PUAL measurement has an objective zero level. The zero value is approached and often reached before the point of respiratory arrest due to OIRD. PUAL comes from measurements of the pupil diameter, measured 30 times per second. From these values a waveform is constructed (diameter versus time). Then that waveform is deconstructed with fast Fourier Transform analysis, at frequency bands between 0.3-3 Hz. This range of frequencies is most discriminative for before versus after presence of a single dose of opioid, after empiric evaluation, including defining zero from measurements on metal sheets containing 3 mm holes.

Figure 6:
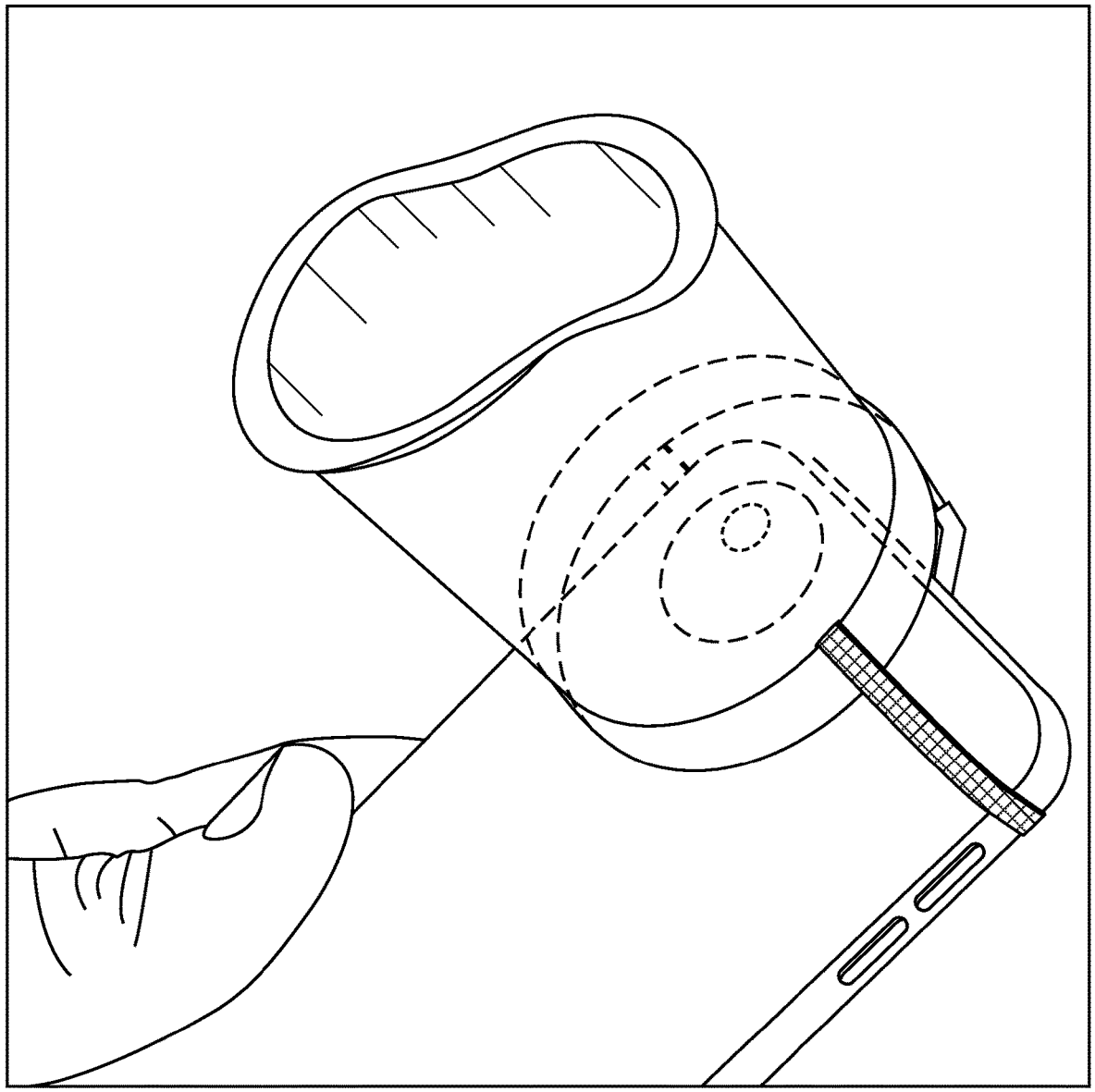
FIG. 6: An example of an adapter for measurement of PUAL connected to a camera of a smart-phone.
Figure 7:
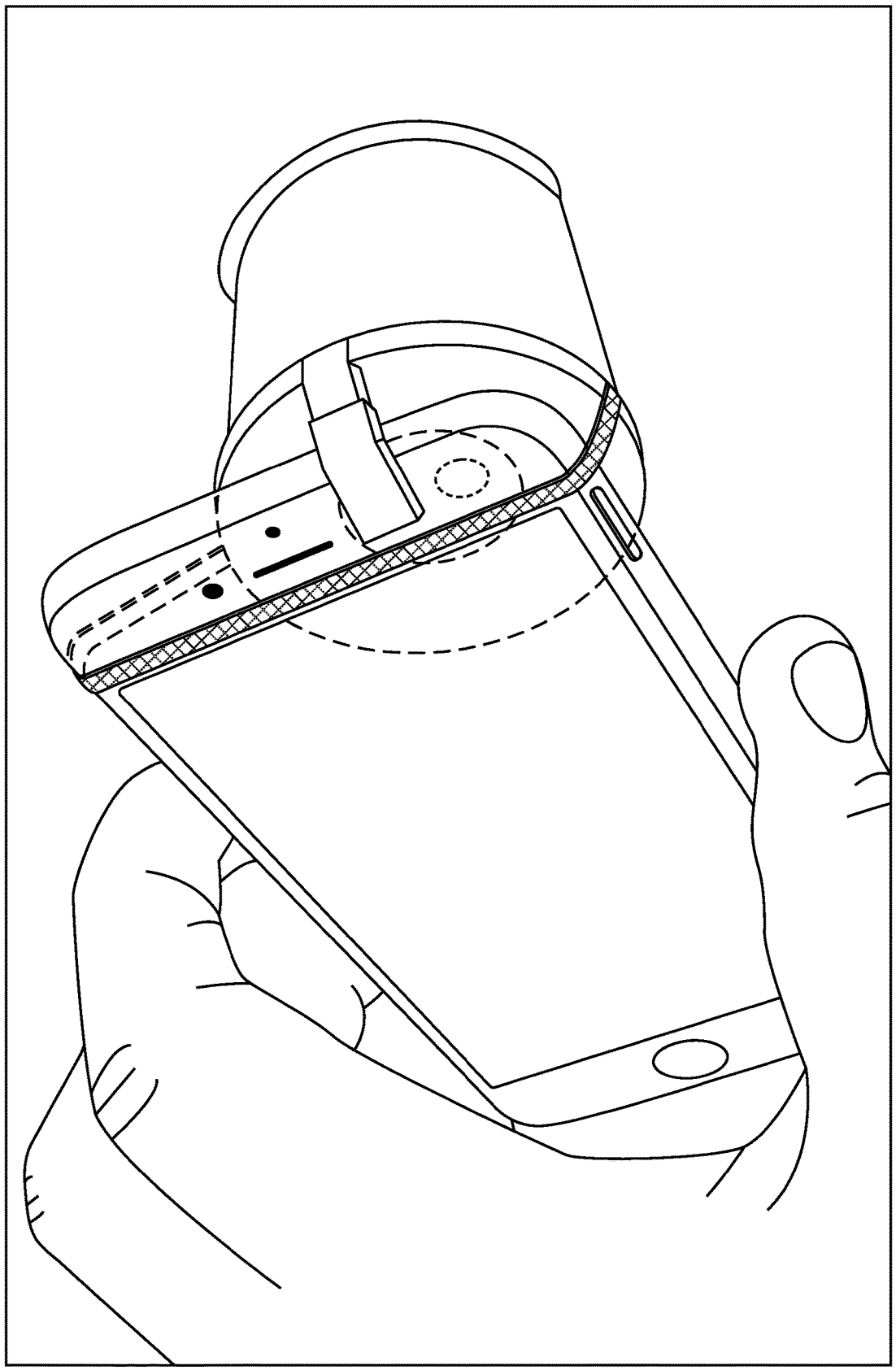
FIG. 7: Another view of the example of the adapter for measurement of PUAL connected to a camera of a smart-phone shown in FIG. 6.
Figure 8:
FIG. 8: An example showing the adapter connected to a smart phone being used to measure PUAL of a person.

In preferred embodiments, PUAL, percent PUAL decline, or Z-score for PUAL is calculated using a portable electronic device, such as a smart-phone or a tablet. The portable electronic device is equipped with a software programmed to measure PUAL, percent PUAL decline, or Z-score for PUAL in a subject. On the portable electronic device, an adapter can be used to engage with a camera that detects infrared light, wherein the adapter can be placed on the eye of a subject to facilitate the software on the portable electronic device to measure PUAL, percent PUAL decline, or Z-score for PUAL in a subject (FIGS. 6-8). In preferred embodiments, the adapter is substantially cylindrical or cone shaped with one end designed to be connected or placed on to the camera of the portable electronic device and the other end designed to be placed on the eye of a subject. The adapter is preferably black or has other dark color to prevent exposure to the subject's eye of visible light. The adapter serves the purposes of stabilizing the portable electronic device to allow an orthogonal imaging approach and exclusion of stray ambient light.

The software installed on the portable electronic device can be programmed to calculate PUAL based on the video of the pupil obtained by the infrared camera, for example, by obtaining a 5 to 20 second video of the pupil by the infrared camera, measuring the pupil diameter about 30 times per second, and deconstructing a waveform with fast Fourier Transform analysis, at frequency bands between 0.3-3 Hz to measure PUAL. This range of frequencies is most discriminative for before versus after presence of a single dose of opioid, after empiric evaluation, including defining zero from measurements on metal sheets containing 3 mm holes. The PUAL so measured could be used to further calculate percent PUAL decline based on earlier PUAL measured from the same subject or Z-score for PUAL based on mean and standard deviation input in the software.

The no risk threshold of PUAL indicates that the subject has negligible risk of an opioid-related adverse event, typically because in the subject opioid is absent or is present at a low concentration that does not induce an opioid-related adverse event. In certain embodiments, the no risk threshold of PUAL is between 0.18 and 0.22, preferably, between 0.19 and 0.2, and even more preferably, about 0.19.

The low risk threshold of PUAL indicates that the subject has low risk of an opioid-related adverse event, typically because in the subject opioid is present at a low concentration that only poses a low risk of an opioid-related adverse event. In certain embodiments, the low risk threshold of PUAL is between 0.14 and 0.20, preferably, between 0.15 and 0.19, and even more preferably, between 0.17 and 0.18, and most preferably, 0.15.

The moderate risk threshold of PUAL indicates that the subject has moderate risk of an opioid-related adverse event, typically because in the subject opioid is present at a moderate concentration that only poses a moderate risk of the opioid-related adverse event. In certain embodiments, the moderate risk threshold of PUAL is between 0.09 and 0.14, preferably, between 0.10 and 0.13, and even more preferably, between 0.11 and 0.12, and most preferably, 0.10.

The high-risk threshold of PUAL indicates that the subject has high risk of an opioid-related adverse event, typically because in the subject opioid is present at a high concentration that poses a high risk of the opioid-related adverse event. In certain embodiments, the high-risk threshold of PUAL is between 0.05 and 0.10, preferably, between 0.06 and 0.09, and even more preferably, between 0.07 and 0.08, and most preferably, 0.05.

The profound risk threshold of PUAL indicates that the subject has profound risk of an opioid-related adverse event, typically because in the subject opioid is present at a very high concentration that poses a profound risk of an opioid-related adverse event. In certain embodiments, the profound risk threshold of PUAL is between 0.04 and 0.05, preferably, 0.04.

In certain embodiments, only one or two thresholds are obtained from the no risk threshold value of PUAL, a low risk threshold value of PUAL, a moderate risk threshold value of PUAL, a high-risk threshold value of PUAL, and a profound risk threshold value of PUAL.

For example, only a high-risk threshold value of PUAL can be obtained. When a subject's PUAL is higher than the high-risk threshold value, the subject is identified as having moderate or less than moderate risk of an opioid-related adverse event. When the subject's PUAL is lower than the high-risk threshold value, the subject is identified as having high risk of the opioid-related adverse event.

Similarly, only a high-risk threshold value of PUAL and a low risk threshold value of PUAL can be obtained. When a subject's PUAL is higher than the low risk threshold value, the subject is identified as having low risk or no risk of an opioid-related adverse event. When the subject's PUAL is lower than the low risk threshold value but higher than the high-risk threshold value, the subject is identified as having moderate risk of an opioid-related adverse event. When the subject's PUAL is lower than the high-risk threshold value, the subject is identified as having high risk of an opioid-related adverse event.

The no risk threshold of percent PUAL decline indicates that the subject has negligible risk of an opioid-related adverse event, typically because in the subject opioid is absent or is present at a low concentration that does not induce an opioid-related adverse event. In certain embodiments, the no risk threshold of percent PUAL decline is between 0 and about 40 percent, preferably, between 20 and 30 percent, and even more preferably, about 30 or about 31 percent.

The low risk threshold of percent PUAL decline indicates that the subject has low risk of an opioid-related adverse event, typically because in the subject opioid is present at a low concentration that only poses a low risk of an opioid-related adverse event. In certain embodiments, the low risk threshold of percent PUAL decline is between 45 and 75 percent, preferably, between 50 and 70 percent, and even more preferably, between 55 and 65 percent, and most preferably, about 58 percent.

The moderate risk threshold of percent PUAL decline indicates that the subject has moderate risk of an opioid-related adverse event, typically because in the subject opioid is present at a moderate concentration that only poses a moderate risk of the opioid-related adverse event. In certain embodiments, the moderate risk threshold of percent PUAL decline is between 65 and 85 percent, preferably, between 70 and 80 percent, and even more preferably, about 75 percent.

The high-risk threshold of percent PUAL decline indicates that the subject has high risk of an opioid-related adverse event, typically because in the subject opioid is present at a high concentration that poses a high risk of the opioid-related adverse event. In certain embodiments, the high-risk threshold of percent PUAL decline is between 70 and 90 percent, preferably, between 75 and 85 percent, and even more preferably, about 80 or 81 percent.

The profound risk threshold of percent PUAL decline indicates that the subject has profound risk of an opioid-related adverse event, typically because in the subject opioid is present at a very high concentration that poses a profound risk of an opioid-related adverse event. In certain embodiments, the high-risk threshold of percent PUAL decline is between 80 and 99 percent, preferably, between 85 and 95 percent, and even more preferably, about 90 percent.

In certain embodiments, only one or two thresholds are obtained from the no risk threshold value of percent PUAL decline, a low risk threshold value of percent PUAL decline, a moderate risk threshold value of percent PUAL decline, a high-risk threshold value of percent PUAL decline, and a profound risk threshold value of percent PUAL decline.

For example, only a high-risk threshold value of percent PUAL decline can be obtained. When a subject's percent PUAL decline is lower than the high-risk threshold value, the subject is identified as having moderate or less than moderate risk of an opioid-related adverse event. When the subject's percent PUAL decline is higher than the high-risk threshold value, the subject is identified as having high risk of the opioid-related adverse event.

Similarly, only a high-risk threshold value of percent PUAL decline and a low risk threshold value of percent PUAL decline can be obtained. When a subject's percent PUAL decline is lower than the low risk threshold value, the subject is identified as having low risk or no risk of an opioid-related adverse event. When the subject's percent PUAL decline is higher than the low risk threshold value but lower than the high-risk threshold value, the subject is identified as having moderate risk of an opioid-related adverse event. When the subject's percent PUAL decline is higher than the high-risk threshold value, the subject is identified as having high risk of an opioid-related adverse event.

The no risk threshold of Z-score for PUAL indicates that the subject has negligible risk of an opioid-related adverse event, typically because in the subject opioid is absent or is present at a low concentration that does not induce an opioid-related adverse event. In certain embodiments, the no risk threshold of Z-score for PUAL is between $-0.5$ to $-1.0$, preferably, between $-0.6$ and $-0.7$, and even more preferably, about $-0.9$.

The low risk threshold of Z-score for PUAL indicates that the subject has low risk of an opioid-related adverse event, typically because in the subject opioid is present at a low concentration that only poses a low risk of an opioid-related adverse event. In certain embodiments, the low risk threshold of Z-score for PUAL is between $-1.1$ and $-1.4$, preferably, between $-1.1$ and $-1.3$, and even more preferably, between $-1.15$ and $-1.25$, and most preferably, about $-1.26$.

The moderate risk threshold of Z-score for PUAL indicates that the subject has moderate risk of an opioid-related adverse event, typically because in the subject opioid is present at a moderate concentration that only poses a moderate risk of the opioid-related adverse event. In certain embodiments, the moderate risk threshold of Z-score for PUAL is between $-1.26$ and $-2.2$, preferably, between $-1.4$ and $-2.1$, and even more preferably, about $-2.0$.

The high-risk threshold of Z-score for PUAL indicates that the subject has high risk of an opioid-related adverse event, typically because in the subject opioid is present at a high concentration that poses a high risk of the opioid-related adverse event. In certain embodiments, the high-risk threshold of Z-score for PUAL is between $-2.0$ and $-2.5$, preferably, between $-2.1$ and $-2.4$, and even more preferably, between $-2.2$ and $-2.3$, and most preferably, about $-2.37$.

The profound risk threshold of Z-score for PUAL indicates that the subject has profound risk of an opioid-related adverse event, typically because in the subject opioid is present at a very high concentration that poses a profound risk of an opioid-related adverse event. In certain embodiments, the high-risk threshold of Z-score for PUAL is between $-2.3$ and $-2.5$, preferably, between $-2.35$ and $-2.45$, and even more preferably, about $-2.37$ or about $-2.4$.

In certain embodiments, only one or two thresholds are obtained from the no risk threshold value of Z-score for PUAL, a low risk threshold value of Z-score for PUAL, a moderate risk threshold value of Z-score for PUAL, a high-risk threshold value of Z-score for PUAL, and a profound risk threshold value of Z-score for PUAL.

For example, only a high-risk threshold value of Z-score for PUAL can be obtained. When a subject's Z-score for PUAL is higher than the high-risk threshold value, the subject is identified as having moderate or less than moderate risk of an opioid-related adverse event. When the subject's Z-score for PUAL is lower than the high-risk threshold value, the subject is identified as having high risk of the opioid-related adverse event.

Similarly, only a high-risk threshold value of Z-score for PUAL and a low risk threshold value of Z-score for PUAL can be obtained. When a subject's Z-score for PUAL is higher than the low risk threshold value, the subject is identified as having low risk or no risk of an opioid-related adverse event. When the subject's Z-score for PUAL is lower than the low risk threshold value but higher than the high-risk threshold value, the subject is identified as having moderate risk of an opioid-related adverse event. When the subject's Z-score for PUAL is lower than the high-risk threshold value, the subject is identified as having high risk of an opioid-related adverse event.

A person of ordinary skill in the art can determine, as appropriate, which one or more of the threshold values can be obtained. A person of ordinary skill in the art can also appropriately stratify risk for a subject based on the selected one or more threshold values. Such embodiments are within the purview of the invention.

For example, PUAL value, percent PUAL decline, or Z-score for PUAL can be stratified into only three categories, such as no risk, moderate or indeterminant risk, and high risk.

In certain such embodiments, the no risk threshold of PUAL indicates that the subject has negligible risk of an opioid-related adverse event, typically because in the subject opioid is absent or is present at a low concentration that does not induce an opioid-related adverse event. For example, the no risk threshold of PUAL can be more than 0.14 AU.

The moderate or indeterminant risk threshold of PUAL indicates that the subject has low risk of an opioid-related adverse event, typically because in the subject opioid is present at a low concentration that only poses a low risk of an opioid-related adverse event. In certain embodiments, the moderate or indeterminant risk threshold of PUAL is between 0.05 and 0.13.

The high-risk threshold of PUAL indicates that the subject has high risk of an opioid-related adverse event, typically because in the subject opioid is present at a high concentration that poses a high risk of the opioid-related adverse event. In certain embodiments, the high-risk threshold of PUAL is between 0.05 and 0.10, preferably, between 0.06 and 0.09, and even more preferably, between 0.07 and 0.08, and most preferably, 0.05.

In further embodiments, a range of PUAL value, percent PUAL decline, or Z-score for PUAL values is provided which indicates the no risk, low risk, moderate risk, high risk, or profound risk of an opioid-related adverse event. For example, PUAL above 0.2 can indicate no risk of an opioid-related adverse event, PUAL between 0.15 and 0.19 can indicate low risk of an opioid-related adverse event; PUAL between 0.10 and 0.15 can indicate moderate risk of an opioid-related adverse event; PUAL between 0.05 and 0.09 can indicate high risk of an opioid-related adverse event; and PUAL lower than 0.04 can indicate profound risk of an opioid-related adverse event.

Similarly, percent PUAL decline below 30 can indicate no risk of an opioid-related adverse event, percent PUAL decline between 30 and 60 percent can indicate low risk of an opioid-related adverse event; percent PUAL decline between 60 and 75 can indicate moderate risk of an opioid-related adverse event; percent PUAL decline between 75 and 80 can indicate high risk of an opioid-related adverse event; and percent PUAL decline higher than 90 can indicate profound risk of an opioid-related adverse event.

Further, Z-score for PUAL below −1.0 can indicate no risk of an opioid-related adverse event, Z-score for PUAL between −1.0 and −1.26 can indicate low risk of an opioid-related adverse event; Z-score for PUAL between −1.26 and −2.0 can indicate moderate risk of an opioid-related adverse event; Z-score for PUAL between −2.0 and −2.37 can indicate high risk of an opioid-related adverse event; and Z-score for PUAL lower than −2.37 can indicate profound risk of an opioid-related adverse event.

Opioid-related adverse events exhibit a full spectrum of severity, ranging from mild pruritus/dermatitis to acute respiratory failure requiring mechanical ventilation. These include, respiratory depression, other respiratory complications, gastrointestinal complications, and central nervous system complications. The severity of these adverse events can range from causing mild discomfort to life threatening complications.

Depending on the identification of a patient as having no risk, low risk, moderate risk, high risk, or profound risk of an opioid-related adverse event, the methods further comprise administering appropriate therapy to the subject.

For a subject having no risk, low risk, or moderate risk of an opioid-related adverse event, appropriate therapy can be administered. For example, if the subject is suffering from pain, opioids can be prescribed to manage pain. After prescribing opioids, PUAL can be monitored intermittently to continuously assess the risk of an opioid-related adverse event.

For a subject having no high risk or profound risk of an opioid-related adverse event, appropriate therapy can be administered. For example, if the subject is suffering from pain, pain medications other than opioids can be prescribed. The subject can be kept under constant monitoring for an event, preferably, for a duration of between 2 hours and 48 hours. The subject is provided mental and social stimulation, for example, by providing personal interactions or providing interactive activities designed to keep the subject active and engaged. Such therapy can be continued until PUAL levels raise higher than at least the moderate risk threshold of PUAL.

Thus, PUAL provides information to a health care provider, and that provider can interpret the test results to adjust the care of that patient. Typically, a high or normal PUAL indicates the absence of significant opioid effect and low or suppressed PUAL indicate presence of opioid effect and risk of opioid toxicity. However, PUAL may fall into an indeterminant range. In such cases, serial measurements with relative change versus a baseline value may be employed. In addition, PUAL and pupillary movement may be limited by other rare syndromes. Therefore, a health-care provider should consider severe diabetic neuropathy, Adie's syndrome, iris damage, blindness and topical medications as other causes of a low PUAL value. These syndromes however would not be relevant if the patient under has previously exhibited normal PUAL values prior to opioid medication. Overall, having baseline PUAL values on all patients prior to opioid medication is optimal so that serial measurements can then be interpreted. It should also be noted that extreme ambient light levels (above 2000 lux) and complete darkness decrease PUAL values. This is not an issue in indoor environments where illumination is typically between 100 and 800 lux.

In certain embodiments, the methods of determining PUAL in the subject, determining in a subject the risk of an opioid-related adverse event, and recommending an appropriate therapy is performed in a computer-implemented method.

Accordingly, certain embodiments of the invention provide a computer-implemented method for determining in a subject the risk of an opioid-related adverse event, the method comprising:
(a) determining, via one or more processors, PUAL in the subject;
(b) providing, to the one or more processors, one or more of: a no risk threshold value of PUAL, a low risk threshold value of PUAL, a moderate risk threshold value of PUAL, a high-risk threshold value of PUAL, and a profound risk threshold value of PUAL; and
(c) identifying, by the one or more processors, the subject as having:
  i) no risk of the opioid-related adverse event if the PUAL in the subject is higher than the no risk threshold value of PUAL, ii) low risk of the opioid-related adverse event if the PUAL in the subject is higher than the low risk threshold value of PUAL but lower than the no risk threshold value of PUAL, iii) moderate risk of the opioid-related adverse event if the PUAL in the subject is higher than the moderate risk threshold value of PUAL but lower than the low risk threshold value of PUAL, iv) high risk of the opioid-related adverse event if the PUAL in the subject is higher than the high-risk threshold value of PUAL but lower than the moderate risk threshold value of PUAL, or v) profound risk of the opioid-related adverse event if the PUAL in the subject is lower than the profound risk threshold value of PUAL.

In certain embodiments, the one or more processors, after identifying the level of risk of an opioid-related adverse event in a subject, further recommend an appropriate therapy to the subject.

Certain embodiments of the invention also provide a computer-implemented method for determining in a subject the risk of an opioid-related adverse event, the method comprising:

(a) determining, via one or more processors, baseline PUAL and test PUAL in the subject;

(b) providing, to the one or more processors, one or more of: a no risk threshold value of percent PUAL decline, a low risk threshold value of percent PUAL decline, a moderate risk threshold value of percent PUAL decline, a high-risk threshold value of percent PUAL decline, and a profound risk threshold value of percent PUAL decline; and (c) identifying, by the one or more processors, the subject as having:

i) no risk of the opioid-related adverse event if the percent PUAL decline in the subject is lower than the no risk threshold value of percent PUAL decline, ii) low risk of the opioid-related adverse event if the percent PUAL decline in the subject is lower than the low risk threshold value of percent PUAL decline but higher than the no risk threshold value of percent PUAL decline, iii) moderate risk of the opioid-related adverse event if the percent PUAL decline in the subject is lower than the moderate risk threshold value of percent PUAL decline but higher than the low risk threshold value of percent PUAL decline, iv) high risk of the opioid-related adverse event if the percent PUAL decline in the subject is lower than the high-risk threshold value of percent PUAL decline but higher than the moderate risk threshold value of percent PUAL decline, or v) profound risk of the opioid-related adverse event if the percent PUAL decline in the subject is higher than the profound risk threshold value of percent PUAL decline.

Further, certain embodiments of the invention also provide a computer-implemented method for determining in a subject the risk of an opioid-related adverse event, the method comprising:

(a) determining, via one or more processors, Z-score for PUAL in the subject;

(b) providing, to the one or more processors, one or more of: a no risk threshold value of Z-score for PUAL, a low risk threshold value of Z-score for PUAL, a moderate risk threshold value of Z-score for PUAL, a high-risk threshold value of Z-score for PUAL, and a profound risk threshold value of Z-score for PUAL; and (c) identifying, by the one or more processors, the subject as having:

i) no risk of the opioid-related adverse event if the Z-score for PUAL in the subject is higher than the no risk threshold value of Z-score for PUAL, ii) low risk of the opioid-related adverse event if the Z-score for PUAL in the subject is higher than the low risk threshold value of Z-score for PUAL but lower than the no risk threshold value of Z-score for PUAL, iii) moderate risk of the opioid-related adverse event if the Z-score for PUAL in the subject is higher than the moderate risk threshold value of Z-score for PUAL but lower than the low risk threshold value of Z-score for PUAL, iv) high risk of the opioid-related adverse event if the Z-score for PUAL in the subject is higher than the high-risk threshold value of Z-score for PUAL but lower than the moderate risk threshold value of Z-score for PUAL, or v) profound risk of the opioid-related adverse event if the Z-score for PUAL in the subject is lower than the profound risk threshold value of Z-score for PUAL.

The aspects of the invention described above, particularly, the use of PUAL, percent PUAL decline, Z-score for PUAL, the specific threshold values, the possible opioid-related adverse events that can occur in a subject, and particularly therapies that could be administered to the subject based on the risk, are applicable to the computer-implemented methods of the invention.

In certain embodiments, the portable electronic device fitted with an adapter is used to obtain an infrared video of an eye of a subject. The raw data from the video is then transported to another computer, which then processes the raw data to provide the PUAL in the subject. In certain such embodiments, the computer that processes the raw data to provide the PUAL in the subject is physically disconnected from the portable electronic device but is connected via a wireless connection. Such wireless connection can be a Wi-Fi connection, Bluetooth connection, or a cellular network connection, such as a 5G connection.

Preferably, then the computer that processes the raw data to provide the PUAL in the subject is located at a remote location from the portable electronic device but is connected via 5-G connection. Therefore, a computer that processes the raw data can be located at a physician's office and a subject can use a portable electronic device fitted with an adapter to record the video of the subject's eye. The portable electronic device can then transmit the raw data to the computer at the physician's office via 5-G. The portable electronic device can also transmit to a computer located at a remote location the PUAL score calculated by the software installed on the device.

In certain methods, the disclosure provides a method of obtaining PUAL in a subject, the method comprising: obtaining a 5 to 20 second video of the pupil by an infrared camera, measuring the pupil diameter about 30 times per second, and deconstructing a waveform with fast Fourier Transform analysis, at frequency bands between 0.3-3 Hz to measure PUAL. In preferred embodiments, the infrared camera is a part of a portable electronic device, such as a smart-phone or a table. The portable electronic device can be fitted with the OPDESS adapter described above.

Computer-Readable Media and Devices

Also provided are computer readable media for implementing a computer-implemented method for determining in a subject the risk of an opioid-related adverse event and devices including such computer readable media.

In certain aspects, provided is a non-transitory computer readable medium including instructions for carrying out the methods for determining in a subject the risk of an opioid-related adverse event, where the instructions, when executed by one or more processors, cause the one or more processors to implement the methods disclosed above for determining in a subject the risk of an opioid-related adverse event.

Various steps of determining PUAL in the subject, identifying the risk of an opioid-related adverse even, and recommending an appropriate therapy to the subject may be as described in the Methods section above. For purposes of brevity, details regarding these steps and other features/elements described in the Methods section of the present disclosure are incorporated but not reiterated herein. In some embodiments, the instructions, when executed by one or more processors, cause the one or more processors to perform any of the methods described in the Methods section herein.

Instructions can be coded onto a non-transitory computer-readable medium in the form of "programming," where the term "computer-readable medium" as used herein refers to any non-transitory storage or transmission medium that participates in providing instructions and/or data to a computer for execution and/or processing. Examples of storage media include a hard disk, optical disk, magneto-optical disk, CD-ROM, CD-R, magnetic tape, non-volatile memory card, ROM, DVD-ROM, Blue-ray disk, solid state disk, network attached storage (NAS), etc., whether such devices are internal or external to the computer. A file containing information can be "stored" on computer readable medium, where "storing" means recording information such that it is later accessible and retrievable by a computer.

The instructions may be in the form of programming that is written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as many others.

The present disclosure also provides computer devices. The computer devices include one or more processors and any of the non-transitory computer readable media of the present disclosure. Accordingly, in some embodiments, the computer devices can perform any of the methods described in the Methods section herein.

In certain aspects, a computer device of the present disclosure is a local computer device. In some embodiments, the computer device is a remote computer device (e.g., a remote server), meaning that the instructions are executed on a computer device different from a local computer device and/or the instructions are downloadable from the remote computer device to a local computer device, e.g., for execution on the local computer device. In some embodiments, the instructions constitute a web-based application stored on a remote server.

Notwithstanding the appended claims, the present disclosure is further defined by the following embodiments:

Embodiment 1. A method for determining in a subject the risk of an opioid-related adverse event, the method comprising:
(a) determining in the subject pupillary unrest in ambient light (PUAL);
(b) obtaining one or more of: a no risk threshold value of PUAL, a low risk threshold value of PUAL, a moderate risk threshold value of PUAL, a high-risk threshold value of PUAL, and a profound risk threshold value of PUAL; and
(c) identifying the subject as having:
   i) no risk of the opioid-related adverse event if the PUAL in the subject is higher than the no risk threshold value of PUAL,
   ii) low risk of the opioid-related adverse event if the PUAL in the subject is higher than the low risk threshold value of PUAL but lower than the no risk threshold value of PUAL,
   iii) moderate risk of the opioid-related adverse event if the PUAL in the subject is higher than the moderate risk threshold value of PUAL but lower than the low risk threshold value of PUAL,
   iv) high risk of the opioid-related adverse event if the PUAL in the subject is higher than the high-risk threshold value of PUAL but lower than the moderate risk threshold value of PUAL, or
   v) profound risk of the opioid-related adverse event if the PUAL in the subject is lower than the profound risk threshold value of PUAL.

Embodiment 2. A method for determining in a subject the risk of an opioid-related adverse event, the method comprising:
(a) determining baseline PUAL and test PUAL in the subject;
(b) obtaining one or more of: a no risk threshold value of percent PUAL decline, a low risk threshold value of percent PUAL decline, a moderate risk threshold value of percent PUAL decline, a high-risk threshold value of percent PUAL decline, and a profound risk threshold value of percent PUAL decline; and
(c) identifying the subject as having:
   i) no risk of the opioid-related adverse event if the percent PUAL decline in the subject is lower than the no risk threshold value of percent PUAL decline,
   ii) low risk of the opioid-related adverse event if the percent PUAL decline in the subject is lower than the low risk threshold value of percent PUAL decline but higher than the no risk threshold value of percent PUAL decline,
   iii) moderate risk of the opioid-related adverse event if the percent PUAL decline in the subject is lower than the moderate risk threshold value of percent PUAL decline but higher than the low risk threshold value of percent PUAL decline,
   iv) high risk of the opioid-related adverse event if the percent PUAL decline in the subject is lower than the high-risk threshold value of percent PUAL decline but higher than the moderate risk threshold value of percent PUAL decline, or
   v) profound risk of the opioid-related adverse event if the percent PUAL decline in the subject is higher than the profound risk threshold value of percent PUAL decline.

Embodiment 3. A method for determining in a subject the risk of an opioid-related adverse event, the method comprising:
(a) determining Z-score for PUAL in the subject;
(b) obtaining one or more of: a no risk threshold value of Z-score for PUAL, a low risk threshold value of Z-score for PUAL, a moderate risk threshold value of Z-score for PUAL, a high-risk threshold value of Z-score for PUAL, and a profound risk threshold value of Z-score for PUAL; and (c) identifying the subject as having:
  i) no risk of the opioid-related adverse event if the Z-score for PUAL in the subject is higher than the no risk threshold value of Z-score for PUAL,
  ii) low risk of the opioid-related adverse event if the Z-score for PUAL in the subject is higher than the low risk threshold value of Z-score for PUAL but lower than the no risk threshold value of Z-score for PUAL,
  iii) moderate risk of the opioid-related adverse event if the Z-score for PUAL in the subject is higher than the moderate risk threshold value of Z-score for PUAL but lower than the low risk threshold value of Z-score for PUAL,
  iv) high risk of the opioid-related adverse event if the Z-score for PUAL in the subject is higher than the high-risk threshold value of Z-score for PUAL but lower than the moderate risk threshold value of Z-score for PUAL, or
  v) profound risk of the opioid-related adverse event if the Z-score for PUAL in the subject is lower than the profound risk threshold value of Z-score for PUAL.

Embodiment 4. The method of any one of the preceding Embodiments, wherein determining PUAL comprises: obtaining a 5 to 20 second video of the pupil by an infrared camera, measuring the pupil diameter about 30 times per second, and deconstructing a waveform with fast Fourier Transform analysis, at frequency bands between 0.3-3 Hz.

Embodiment 5. The method of any one of the preceding Embodiments, wherein determining PUAL comprises using a portable electronic device equipped with a software programmed to measure PUAL and fitted with an adapter that engages at one end with an infrared camera on the portable electronic device and engages at the other end with an eye of the subject to facilitate the software on the portable electronic device to determine PUAL in a subject.

Embodiment 6. The method of Embodiment 5, wherein the adapter is substantially cylindrical or cone shaped with one end designed to be connected or placed on to the camera of the portable electronic device and the other end designed to be placed on the eye of a subject.

Embodiment 7. The method of Embodiment 6, wherein the adapter is black or dark colored.

Embodiment 8. The method of any one of the preceding Embodiments, wherein:
  (a) the no risk threshold of PUAL is about 0.19;
  (b) the low risk threshold of PUAL is about 0.15;
  (c) the moderate risk threshold of PUAL is about 0.10;
  (d) the high-risk threshold of PUAL is about 0.05; and
  (e) the profound risk threshold of PUAL is about 0.04.

Embodiment 9. The method of any one of Embodiments 1 to 7, wherein:
  (a) the no risk threshold of percent PUAL decline is about 31 percent;
  (b) the low risk threshold of percent PUAL decline is about 58 percent;
  (c) the moderate risk threshold of percent PUAL decline is about 75 percent;
  (d) the high-risk threshold of percent PUAL decline is about 81 percent; and
  (e) the profound risk threshold of percent PUAL decline is about 90 percent.

Embodiment 10. The method of any one of Embodiments 1 to 7, wherein:
  (a) the no risk threshold of Z-score for PUAL is about −1.0;
  (b) the low risk threshold of Z-score for PUAL is about −1.26;
  (c) the moderate risk threshold of Z-score for PUAL is about −2.0;
  (d) the high-risk threshold of Z-score for PUAL is about −2.36; and
  (e) the profound risk threshold of Z-score for PUAL is about −2.37.

Embodiment 11. The method of any one of the preceding Embodiments, wherein the opioid-related adverse event is one or more of: mild pruritus/dermatitis, respiratory depression, gastrointestinal complications, central nervous system complications, and acute respiratory failure requiring mechanical ventilation.

Embodiment 12. The method of any one of the preceding Embodiments, further comprising administering appropriate therapy to the subject based on the determined level of risk of the opioid-related adverse event.

Embodiment 13. The method of Embodiment 12, comprising administering an opioid to a subject suffering from pain and identified as having less than moderate risk of the opioid-related adverse event and, optionally, further monitoring PUAL intermittently to continuously assess the risk of the opioid-related adverse event.

Embodiment 14. The method of Embodiment 12, comprising administering a pain medication other than an opioid to a subject suffering from pain and identified as having high risk or profound risk of the opioid-related adverse event.

Embodiment 15. The method of Embodiment 12, comprising monitoring the subject identified as having high risk or profound risk of the opioid-related adverse event.

Embodiment 16. The method of Embodiment 12, comprising providing personal interactions and/or interactive activities to keep stimulated and engaged the subject identified as having high risk or profound risk of the opioid-related adverse event.

Embodiment 17. A computer-implemented method for determining in a subject the risk of an opioid-related adverse event, the method comprising:
  (a) determining, via one or more processors, in the subject pupillary unrest in ambient light (PUAL);
  (b) obtaining, via one or more processors, one or more of: a no risk threshold value of PUAL, a low risk threshold value of PUAL, a moderate risk threshold value of PUAL, a high-risk threshold value of PUAL, and a profound risk threshold value of PUAL; and
  (c) identifying, via one or more processors, the subject as having:
    i) no risk of the opioid-related adverse event if the PUAL in the subject is higher than the no risk threshold value of PUAL,
    ii) low risk of the opioid-related adverse event if the PUAL in the subject is higher than the low risk threshold value of PUAL but lower than the no risk threshold value of PUAL,
    iii) moderate risk of the opioid-related adverse event if the PUAL in the subject is higher than the moderate risk threshold value of PUAL but lower than the low risk threshold value of PUAL,
    iv) high risk of the opioid-related adverse event if the PUAL in the subject is higher than the high-risk threshold value of PUAL but lower than the moderate risk threshold value of PUAL, or v) profound risk of the opioid-related adverse event if the PUAL in the subject is lower than the profound risk threshold value of PUAL.

Embodiment 18. A computer-implemented method for determining in a subject the risk of an opioid-related adverse event, the method comprising:
(a) determining, via one or more processors, baseline PUAL and test PUAL in the subject;
(b) providing, to the one or more processors, one or more of: a no risk threshold value of percent PUAL decline, a low risk threshold value of percent PUAL decline, a moderate risk threshold value of percent PUAL decline, a high-risk threshold value of percent PUAL decline, and a profound risk threshold value of percent PUAL decline; and
(c) identifying, by the one or more processors, the subject as having:
 i) no risk of the opioid-related adverse event if the percent PUAL decline in the subject is lower than the no risk threshold value of percent PUAL decline,
 ii) low risk of the opioid-related adverse event if the percent PUAL decline in the subject is lower than the low risk threshold value of percent PUAL decline but higher than the no risk threshold value of percent PUAL decline,
 iii) moderate risk of the opioid-related adverse event if the percent PUAL decline in the subject is lower than the moderate risk threshold value of percent PUAL decline but higher than the low risk threshold value of percent PUAL decline,
 iv) high risk of the opioid-related adverse event if the percent PUAL decline in the subject is lower than the high-risk threshold value of percent PUAL decline but higher than the moderate risk threshold value of percent PUAL decline, or
 v) profound risk of the opioid-related adverse event if the percent PUAL decline in the subject is higher than the profound risk threshold value of percent PUAL decline.

Embodiment 19. A computer-implemented method for determining in a subject the risk of an opioid-related adverse event, the method comprising:
(a) determining, via one or more processors, Z-score for PUAL in the subject;
(b) providing, to the one or more processors, one or more of: a no risk threshold value of Z-score for PUAL, a low risk threshold value of Z-score for PUAL, a moderate risk threshold value of Z-score for PUAL, a high-risk threshold value of Z-score for PUAL, and a profound risk threshold value of Z-score for PUAL; and
(c) identifying, by the one or more processors, the subject as having:
 i) no risk of the opioid-related adverse event if the Z-score for PUAL in the subject is higher than the no risk threshold value of Z-score for PUAL,
 ii) low risk of the opioid-related adverse event if the Z-score for PUAL in the subject is higher than the low risk threshold value of Z-score for PUAL but lower than the no risk threshold value of Z-score for PUAL,
 iii) moderate risk of the opioid-related adverse event if the Z-score for PUAL in the subject is higher than the moderate risk threshold value of Z-score for PUAL but lower than the low risk threshold value of Z-score for PUAL,
 iv) high risk of the opioid-related adverse event if the Z-score for PUAL in the subject is higher than the high-risk threshold value of Z-score for PUAL but lower than the moderate risk threshold value of Z-score for PUAL, or
 v) profound risk of the opioid-related adverse event if the Z-score for PUAL in the subject is lower than the profound risk threshold value of Z-score for PUAL.

Embodiment 20. The computer-implemented method of any one of Embodiments 17 to 19, wherein determining PUAL, via one or more processors, comprises: obtaining, via one or more processors, a 5 to 20 second video of the pupil by an infrared camera, measuring, via one or more processors, the pupil diameter about 30 times per second, and deconstructing, via one or more processors, a waveform with fast Fourier Transform analysis, at frequency bands between 0.3-3 Hz.

Embodiment 21. The computer-implemented method of any one of Embodiments 17 to 20, wherein determining PUAL, via one or more processors, comprises activating a portable electronic device equipped with a software programmed to measure PUAL and fitted with an adapter that engages at one end with an infrared camera on the portable electronic device and engages at the other end with an eye of the subject to facilitate the software on the portable electronic device to determine PUAL in a subject.

Embodiment 22. The computer-implemented method of Embodiment 21, wherein the adapter is substantially cylindrical or cone shaped with one end designed to be connected or placed on to the camera of the portable electronic device and the other end designed to be placed on the eye of a subject.

Embodiment 23. The computer-implemented method of Embodiment 22, wherein the adapter is black or dark colored.

Embodiment 24. The computer-implemented method of any one of Embodiments 17 to 23, wherein:
(a) the no risk threshold of PUAL is about 0.19;
(b) the low risk threshold of PUAL is about 0.15;
(c) the moderate risk threshold of PUAL is about 0.10;
(d) the high-risk threshold of PUAL is about 0.05; and
(e) the profound risk threshold of PUAL is about 0.04.

Embodiment 25. The computer-implemented method of any one of Embodiments 17 to 23, wherein:
(a) the no risk threshold of percent PUAL decline is about 31 percent;
(b) the low risk threshold of percent PUAL decline is about 58 percent;
(c) the moderate risk threshold of percent PUAL decline is about 75 percent;
(d) the high-risk threshold of percent PUAL decline is about 81 percent; and
(e) the profound risk threshold of percent PUAL decline is about 90 percent.

Embodiment 26. The computer-implemented method of any one of Embodiments 17 to 23, wherein:
(a) the no risk threshold of Z-score for PUAL is about −1.0;
(b) the low risk threshold of Z-score for PUAL is about −1.26;
(c) the moderate risk threshold of Z-score for PUAL is about −2.0;
(d) the high-risk threshold of Z-score for PUAL is about −2.36; and
(e) the profound risk threshold of Z-score for PUAL is about −2.37.

Embodiment 27. The computer-implemented method of any one of the Embodiments 17 to 26, wherein the opioid-related adverse event is one or more of: mild pruritus/ dermatitis, respiratory depression, gastrointestinal complications, central nervous system complications, and acute respiratory failure requiring mechanical ventilation.

Embodiment 28. The computer-implemented method of any one of the Embodiments 17 to 27, further comprising recommending, via one or more processors, an appropriate therapy to the subject based on the determined level of risk of the opioid-related adverse event.

Embodiment 29. The computer-implemented method of Embodiment 28, comprising recommending, via one or more processors, administering an opioid to a subject suffering from pain and identified as having less than moderate risk of the opioid-related adverse event and, optionally, further recommending, via one or more processors, monitoring PUAL intermittently to continuously assess the risk of the opioid-related adverse event.

Embodiment 29. The computer-implemented method of Embodiment 28, comprising recommending, via one or more processors, administering a pain medication other than an opioid to a subject suffering from pain and identified as having high risk or profound risk of the opioid-related adverse event.

Embodiment 30. The computer-implemented method of Embodiment 28, comprising recommending, via one or more processors, monitoring a subject identified as having high risk or profound risk of the opioid-related adverse event.

Embodiment 31. The computer-implemented method of Embodiment 28, comprising recommending, via one or more processors, providing personal interactions and/or interactive activities to keep stimulated and engaged a subject identified as having high risk or profound risk of the opioid-related adverse event.

Embodiment 32. A non-transitory computer readable medium comprising instructions, when executed by one or more processors, cause the one or more processors to perform the method according to any one of Embodiments 17 to 31.

Embodiment 33. A computer device, comprising: one or more processors; and the non-transitory computer readable medium of Embodiment 32.

Embodiment 34. A portable electronic device comprising an infrared camera and an adapter fitted with the infrared camera to obtain an infrared video of an eye of a subject.

Embodiment 35. The portable electronic device of Embodiment 34, further comprising installed thereon a software programmed to measure PUAL in a subject.

Embodiment 36. The portable electronic device of Embodiment 35, wherein the software is programmed to measure PUAL in a subject comprising the steps of: obtaining, through the infrared camera, a video for between 5 seconds and 20 seconds of the pupil of the subject, measuring the pupil diameter about 30 times per second, and deconstructing a waveform with fast Fourier Transform analysis at frequency bands between 0.3-3 Hz to measure PUAL.

Embodiment 37. The portable electronic device of Embodiment 33, wherein the device obtains raw data for an infrared video of an eye of a subject.

Embodiment 38. The portable electronic device of Embodiment 37, wherein the device transmits the raw data for the infrared video of the eye of the subject to a computer having installed thereon a software programmed to measure PUAL in the subject based on the raw data provided by the device.

Embodiment 39. The portable electronic device of Embodiment 38, wherein the device transmits the raw data to the computer via Bluetooth connection, Wi-Fi connection, or 5-G connection.

Embodiment 40. The portable electronic device of any one of Embodiments 33 to 39, wherein the adapter is substantially cylindrical or cone shaped with one end designed to engage with the infrared camera of the portable electronic device and the other end designed to be placed on an eye of the subject.

Embodiment 41. The portable electronic device of any one of Embodiments 33 to 40, wherein the adapter is black or dark colored.

Embodiment 42. A method of obtaining PUAL in a subject, the method comprising: obtaining a 5 to 20 second video of a pupil of the subject by an infrared camera, measuring the pupil diameter about 30 times per second, and deconstructing a waveform with fast Fourier Transform analysis, at frequency bands between 0.3-3 Hz to measure PUAL.

EXPERIMENTAL

Example 1—Determining the Level of PUAL in a Subject that Indicates the Risk of an Opioid-Related Adverse Event The study described herein was registered in the United States National Library of Medicine (see world-wide-website: clinicaltrials.gov) under identifier NCT04301895 and retrospectively registered on Mar. 9, 2020.

OIRD confers significant morbidity, but its onset can be challenging to recognize. Pain or stimulation effects of conversation may mask or attenuate common clinical manifestations of OIRD. Pupillary unrest was tested as an objective signal of opioid exposure, and whether this signal would be independent from the confounding influence of extrinsic stimulation.

A cross-over trial of healthy volunteers was conducted using identical remifentanil infusions separated by a washout period; in both, PUAL was measured at 2.5-minute intervals. During one infusion, investigators continuously engaged the subject in conversation, while in the other, a quiet environment was maintained; measures of respiratory depression were compared under each condition. Following parameters were estimated: PUAL's relationship to estimated opioid concentration under quiet conditions, PUAL's discrimination of lower versus higher opioid exposure using receiver operating characteristic (ROC) analysis, and the effect of stimulation on PUAL versus opioid using mixed effects regression.

Thus, a cross-over study was conducted in which subjects underwent two standardized remifentanil infusion protocols, separated by a washout period, each with identical parameters other than the level of stimulation and amount of interaction permitted. Twenty healthy volunteers 18-55 years of age participated in this trial. Exclusion criteria included use of opioid agonist, partial agonist or antagonist within the prior thirty days, active or chronic cardiac, pulmonary or neurologic conditions, diabetes, OSA, BMI >35 kg/m$^2$, active GERD, or any current or previous substance use disorder. Lighting conditions (200 lux) were strictly controlled, and the room was free of distracting noise. After an 8-hour fasting period, baseline measurements were taken, a peripheral IV was placed, and all subjects received antiemetic prophylaxis consisting of aprepitant 40 mg by mouth and ondansetron 4 mg IV.

After prophylactic antiemetic medications were given, baseline vital signs, including $SpO_2$, end-tidal $CO_2$ and ventilatory rate measured by side-stream capnograph incorporated into a nasal cannula, 3-lead EKG, non-invasive blood pressure, ventilatory rate, and transcutaneous $CO_2$, were recorded.

A 30-minute washout period separated each protocol, and the sequence (interactive-then-quiet versus quiet-then-interactive) alternated with each successive enrollee. Lighting conditions (200 lux) were strictly controlled, and the room was free of distracting noise. After providing written informed consent, subjects received one peripheral IV, baseline pupillary and vital-sign measurements, and prophylactic antiemetic medication (aprepitant 40 mg+ondansetron 4 mg).

Measurements:

Pupillary measurements were made with hand-held infrared pupillometer (Neuroptics VIP-300, Irvine California). Each subject was asked to look with the left eye into the black rubber cone-shaped eye piece affixed to the pupillometer. This eye piece was situated to exclude ambient light, and at the same time, the operator's left hand excluded ambient light from the contralateral eye. Since the pupil diameter does not fluctuate in darkness, a soft blurred disk of blue light from a 50 µ-watt source, at precisely 200 lux illumination, was then directed at the measured eye for three seconds to initiate the oscillation in pupil size, after which the 10-second infrared video of the pupil was taken. The videos were processed post hoc within a specific range of frequency bands by fast Fourier transformation to quantitate the PUAL measurement. PUAL values are expressed in arbitrary units (AU) by convention. Additional details of this technique have been described by Neice et al. Previous calibration of the PUAL, obtained by measuring metal holes of known diameter (2.6-4.8 mm), allowed subtraction of inherent noise and establishment of zero at the lower scale boundary. In addition to PUAL, the average pupil diameter (millimeters) was recorded during each PUAL measurement.

Study Protocol:

After baseline measurements, a 35-minute test sequence began, during which vital signs were continuously monitored and pupillary measurements were taken every 2.5 minutes. During the first 10 minutes of the 35-minute sequence, remifentanil was infused at a predetermined rate described below. Under interactive conditions, sedation assessment was made using the Pasero Opioid-Induced Sedation (POSS) Scale.

The first 35-minute sequence was followed by a 30-minute rest period, during which the subject was observed but no pupillary measurements were taken. After the 30-minute rest period, a second sequence of drug infusion and measurements was conducted, identical to the first 35-minute sequence except an environmental stimulation was provided. Particularly, in "Study A," the investigators recreated a stimulating environment, continuously engaging the subject in conversation and applying a standard cold stimulus to the right or left upper extremity at regular intervals. In "Study B," a quiet environment was created by the maintenance of strict silence and a distance of 6 feet or more between investigator and subject except at the times pupil measurements were taken. The sequence for conduct of these two studies (A/B versus B/A) was determined sequentially by subject number. In both studies, the PUAL, pupillary diameter, transcutaneous $CO_2$, ventilatory rate and $SpO_2$ were measured every 2.5 minutes. Additional assessments during Study A included the subject's reported VAS score in response to the ice stimulus, and assessment of level of consciousness by the Pasero Opioid-Induced Sedation Scale.

Opioid Infusion:

Remifentanil was infused for 10 minutes—at a rate of 0.2 µg/kg/minute for the first 5 minutes, then was increased to a rate of 0.3 µg/kg/minute for the next 5 minutes, and then stopped. Remifentanil dosing was based upon total body weight and the specific infusion protocol was chosen with the goal of reaching estimated remifentanil effect site concentration of ≥5 ng/mL, a level that has been reported to produce near-maximum isoflurane MAC reduction and a high probability of apnea. After remifentanil discontinuation, continuous monitoring and measurements every 2.5 minutes continued for 25 additional minutes. To avoid the stimulating effect of sequential blood drawing or the added risk of arterial line placement to facilitate repeated blood sampling, remifentanil blood concentration was not measured, choosing instead to use an infusion protocol based on the Minto model that, when given to eligible subjects, would achieve an estimated maximum effect site concentration of 4-6 ng/mL, a level known to produce near-maximum isoflurane MAC reduction and high probability of apnea. During both interactive and quiet conditions, the investigators avoided prompting the subjects to breathe, until and unless $SpO_2$ fell to 90%. The recovery and washout periods between the two infusions were chosen so that in each case, subjects would start the second run of the two experiments at near-zero remifentanil concentration, and could realistically complete participation in the study within a 3-hour window. The objective in timing the separation of these two infusions in Study A and Study B was to provide an adequate washout period so that in each case, subjects started the second study at near-zero remifentanil concentration, and complete participation in the study within 2.5 hours.

Outcomes:

Primary outcomes were 1) frequency of $CO_2$ increase and desaturation in the quiet versus interactive conditions; 2) correlation between PUAL and intensity of opioid exposure (represented by time-points corresponding to progressively increasing and declining estimated opioid concentrations); and 3) impact of the quiet versus interactive conditions on opioid-related changes in PUAL.

Respiratory depression occurred more frequently under quiet conditions ($p<0.0001$). Under both conditions, PUAL declined significantly over the course of the remifentanil infusion and rose during recovery ($p<0.0001$). PUAL showed excellent discrimination in distinguishing higher versus absent-moderate opioid exposure (AUROC=0.957 [0.929 to 0.985]), but was unaffected by interactive versus quiet conditions (mean difference, interactive−quiet=− 0.007, 95% CI −0.016 to 0.002).

Clinically relevant respiratory depression and oxyhemoglobin desaturation were compared in Study B versus Study A. Criteria for respiratory depression was an increase in $CO_2$ of ≥15% above baseline. Oxyhemoglobin desaturation was defined as $SpO_2$ decline to ≤90%, prompting supplemental oxygen administration and any supplemental support needed to maintain $SpO_2≥92\%$. Second, the time between initiation of remifentanil infusion and the juncture at which the oxyhemoglobin desaturation occurred was compared. Also, the overall increase in $CO_2$ in both arms was compared. Respiratory depression and oxyhemoglobin desaturation were hypothesized to be more frequent and was also hypothesized to occur more rapidly (at relatively lower estimated opioid effect-site concentrations), among subjects in the non-stimulating environment (Study B) compared to the interactive and stimulating (Study A) environment.

PUAL values were compared by the study time-point at which they were measured. PUAL was hypothesized to decline and recover in direct correlation with a rise and fall of opioid concentrations. Unlike the respiratory outcomes, PUAL values were hypothesized to not be affected by the level of stimulation within the environment and therefore was hypothesized to not differ significantly between Study A versus Study B.

Thus, PUAL is a consistent indicator of opioid effect, and distinguishes higher opioid concentrations independently of the stimulating effects of conversational interaction. Under equivalent opioid exposure, conversational interaction delayed the onset and minimized the severity of OIRD.

Sample Size Calculation:

Assuming an average (SD) baseline PUAL of 0.246 (0.125) based on an observational sample of deidentified patients, 17 subjects would provide 80% power to demonstrate a 50% decline in PUAL at 5 minutes, with an two-sided alpha=0.05. Therefore, 20 subjects were enrolled.

Statistical Considerations:

All analysis was performed using Stata 16 (College Station, TX).

20 subjects were tested under paired conditions—absent versus uninterrupted conversational interaction—over a 35-minute period. After testing whether the sequence of conditions affected any outcomes, and observing no significant difference, all analyses were conducted disregarding the sequence in which the subjects experienced the background conditions.

To establish whether presence of environmental stimulation delayed or prevented opioid-induced adverse respiratory outcomes, the incidence of events meeting criteria for respiratory depression or oxyhemoglobin desaturation, e.g., the magnitude of $CO_2$ increase, and time of onset for all oxyhemoglobin desaturation events in Study A versus Study B were compared. For continuous measurements, such as percent increase in $CO_2$ and time of onset until desaturation, t-test was used. To compare incidence of respiratory depression and desaturation, chi-square or Fisher exact tests was used as appropriate.

To evaluate changes in PUAL as an indication of opioid effect, correlation between PUAL and specific study time-points was investigated. Dividing the study into periods of drug infusion (0-10 minutes, where opioid concentrations progressively increased) and recovery (10-35 minutes, where opioid concentrations incrementally declined), the pharmacokinetic model by Minto was applied to estimate the shape of a remifentanil concentration versus time relationship during the infusions. Using each 2.5-minute time period during the infusion phase as a surrogate for greater opioid concentration, correlation between the magnitude and consistency of PUAL decline using repeated-measures ANOVA was investigated. When desaturation occurred, PUAL that most closely coincided with the hypoxic event was examined and was compared to PUAL measured before the drug infusion began using paired t-tests. Concomitant changes were examined in resting pupil diameter, $CO_2$, ventilatory rate and POSS scores during the 10-minute infusion period, with specific focus on infusions during which desaturation took place. The consistency and magnitude of any changes in these parameters was compared to changes in PUAL over the same time-period. Finally, possible interaction was investigated between the stimulating versus non-stimulating environments (Study A versus Study B) and the relationship between PUAL measurements and time-points corresponding to relative changes in opioid concentration.

Relationship Between Environmental Condition (Interactive Versus Quiet) and Respiratory Outcomes:

To establish whether conversational interaction mitigated OIRD, quiet versus interactive conditions were compared in each subject on the following binary outcomes (McNemar's test, 2 tails): oxyhemoglobin desaturation ($SpO_2 \leq 90\%$), elevated transcutaneous $CO_2$ (defined as $\geq 15\%$ increase in above baseline), and ventilatory rate <10/min. The highest observed $CO_2$ were compared in each subject under each condition, and the maximum proportional increase in $CO_2$ compared to baseline by the Wilcoxon signed rank test. Finally, the time to onset of desaturation ($SpO_2 < 90\%$) were compared in each subject under the two conditions using a conditional Cox proportional hazards model.

Correlation Between PUAL and Opioid Concentration:

PUAL and opioid concentration were examined under quiet conditions, during both drug infusion (0-10 minutes, where opioid concentrations progressively increased) and recovery (10-35 minutes, where opioid concentrations progressively declined). Each 2.5-minute point was treated as an ordinal variable "time", and opioid effect-site concentrations were calculated at each time point according to the Minto pharmacokinetic model estimates. The effect of time (as surrogate for opioid concentration) on PUAL was assessed using a generalized estimating equations (GEE) regression.

To test PUAL's discrimination between high versus absent-to-moderate opioid exposure receiver operator characteristic (ROC) analysis was used, with 0 and 2.5 minute time-points corresponding with absent-to-moderate opioid exposure, versus 5.0, 7.5, 10.0, and 12.5-minute time points corresponding to high opioid exposure. Initially this approach was based on relative changes in estimated remifentanil effect site concentrations, but after completion of data collection further analysis was performed to confirm the validity of the approach, using both age and body-size characteristics of the participants and the average onset of desaturation.

Relationship Between Pupillary Findings (PUAL and Pupil Diameter) and Environmental Stimulation:

After establishing the relationship between PUAL and opioid exposure under quiet conditions (second objective), PUAL was compared under interactive versus quiet conditions using mixed effects regression, with experimental condition and timepoint as the categorical fixed effects, and subject number as the (categorical) random effect. The model outcome estimated the overall difference in PUAL in the two conditions (interactive–quiet). Conditional Cox regression was also performed to compare the time from start of the remifentanil infusion until 90% PUAL suppression was reached under both quiet and interactive conditions.

RESULTS

Subjects characteristics are displayed below in Table 1.

TABLE 1

| Characteristic | Mean ± SD |
| --- | --- |
| Age (years) | 25.6 ± 3.3 |
| Gender (n) F/M | 13/7 |
| Height (cm) | 166.8 ± 9.6 |

TABLE 1-continued

| Characteristic | Mean ± SD |
| --- | --- |
| Weight (kg) | 64.7 ± 12.2 |
| BMI (kg/m2) | 23.2 ± 4.1 |
| Baseline PUAL Run 1 | 0.269 ± 0.106 |
| Baseline PUAL Run 2 | 0.260 ± 0.103 |

Paired t-test comparison of baseline PUAL at the beginning of Run 1 and Run 2: Difference 0.010 (95% CI −0.026 to 0.045; p=0.5870).

Baseline PUAL ranged from 0.12 to 0.54 AU (median 0.27, IQR 0.18 to 0.33). Comparison of pre-infusion PUAL between Run 1 and Run 2 showed no meaningful difference (0.010; 95% CI −0.026 to 0.045; p=0.5870, Table 1).

Remifentanil Infusion Phase (Minutes 0-10):

Baseline PUAL and average diameter measurements did not differ significantly between Run 1 versus Run 2, or between Study A versus Study B. Serial pupil measurements taken at time points 0, 2.5, 5.0, 7.5, and 10 minutes from the start of the remifentanil infusion corresponded with progressive increase in estimated opioid concentration in concordance with the pharmacokinetic model. At these time points, PUAL decline was profound and consistent, progressing from baseline values to near zero (average overall decline 96%, ANOVA F-statistic 94.4 with 198 dF, Bartlett chi2=182.38, P<0.001). Resting pupil diameter likewise declined significantly during these time intervals, although compared to PUAL, the decline in diameter was less pronounced and did not approach a defining lower boundary (average overall decline 49%, Bartlett chi2=63.77, P<0.001). No significant differences in serial measurements of PUAL or resting pupil diameter during the remifentanil infusion were observed between Run 1 versus Run 2, or between Study A versus Study B.

TABLE 2

| Measurement | Run 1 | Run 2 | Interactive | Non-interactive |
| --- | --- | --- | --- | --- |
| Respiratory Depression (≥15% $CO_2$ Increase) | 15 (0.75) | 19 (0.95) | 14 (0.70) | 20 (100)^ |
| Highest $CO_2$ (mm Hg) | 47.41 (43.30-51.52) | 46.93 (44.06-49.81) | 43.37 (40.66-46.09) | 50.97^^ (47.62-54.32) |
| Highest $CO_2$ Increase (%) above Baseline | 26.6 (19.5-33.7) | 32.8 (26.4-39.1) | 21.3 (15.0-27.7) | 37.5 (32.5-42.5)* |
| Time (Seconds) from Start of Remifentanil to Desaturation | 479 ± 149 | 444 ± 179 | 557 ± 132 | 409 ± 159** |
| Oxyhemoglobin Desaturation, n (%) | 13 (65) | 16 (80) | 10 (50) | 19 (95)*** |

^Respiratory Depression, defined as highest $CO_2$ ≥ 15% above baseline, did not differ significantly between Runs 1 and 2 (Fisher exact p = 0.1820) but was significantly more frequent in the non-interactive Study B versus interactive Study A (Fisher exact p = 0.020).
^^The highest $CO_2$ was significantly greater during the non-interactive study than the interactive study (p = 0.0007)
*Maximum percent rise in $CO_2$ was significantly greater in non-interactive Study B compared to interactive Study A; t-statistic = 4.22 with 37 DF, P = 0.0007. However, the difference between Run 2 versus Run 1 was not statistically significant (p = 0.182).
**Time from start of remifentanil infusion until onset of desaturation was significantly longer among subjects in interactive Study A versus non-interactive Study B; t-statistic = −2.52 with 27 DF, P = 0.0179.
***Oxyhemoglobin desaturation occurred significantly more often in the non-interactive Study B versus the interactive Study A (2-sided Fisher exact P = 0.002); the frequency difference between Run 1 and Run 2 did not differ statistically (p = 0.480).

TABLE 3

| Measurement | Run 1 | Run 2 | Interactive | Non-interactive |
| --- | --- | --- | --- | --- |
| PUAL at Baseline | 0.269 ± 0.106 | 0.259 ± 0.102 | 0.265 ± 0.107 | 0.263 ± 0.101 |
| Lowest PUAL | 0.001 ± 0.008# | 0.007 ± 0.008# | 0.007 ± 0.009# | 0.011 ± 0.007# |
| Maximum PUAL Decline (% Baseline) | 95.65 ± 4.71 | 96.54 ± 4.31 | 96.39 ± 5.01 | 95.79 ± 3.98 |
| PUAL at Desaturation | 0.021 ± 0.025& | 0.021 ± 0.018& | 0.011 ± 0.012& | 0.027 ± 0.023&¢ |

Difference between baseline and nadir PUAL values, t-test of equal variance, P < 0.0001
¢Difference between PUAL at time of desaturation in Study B versus Study A; t-test of unequal variances, P = 0.0256
&Difference between PUAL at desaturation versus PUAL at baseline, t-test of unequal variances, P ≤ 0.0001

TABLE 4

| Measurement | Run 1 | Run 2 | Interactive | Non-interactive |
| --- | --- | --- | --- | --- |
| Diameter at Baseline (mm) | 4.437 ± 0.620 | 4.245 ± 0.537 | 4.396 ± 0.542 | 4.287 ± 0.626 |

TABLE 4-continued

| Measurement | Run 1 | Run 2 | Interactive | Non-interactive |
|---|---|---|---|---|
| Lowest Diameter | 2.166 ± 0.233## | 2.144 ± 0.239## | 2.156 ± 0.231## | 2.155 ± 0.232## |
| Maximum Diameter Decline (% Baseline) | 49.33 ± 11.50 | 49.16 ± 8.27 | 49.51 ± 8.48 | 48.99 ± 11.33 |
| Diameter at Desaturation | 2.344 ± 0.473 | 2.374 ± 0.344 | 2.185 ± 0.186 | 2.453 ± 0.452¢¢ |

Difference between baseline and nadir pupil diameter, t-test of equal variance, P < 0.0001
¢¢Difference between pupil diameter at time of desaturation in Study B versus Study A; t-test of unequal variances, P = 0.0333

TABLE 5

| Interactive Run | Desaturation (N = 10) | No Desaturation (N = 10) |
|---|---|---|
| Highest POSS Score | 1.60 ± 0.27 | 1.20 ± 0.42 ## |
| Highest POSS Score 1/2/3 (n) | 4/6/0 | 8/2/0 ### |

KW chi2 = 3.167 w 1 dF (with ties), p = 0.0752
Fisher exact p = 0.170

Figure 2:
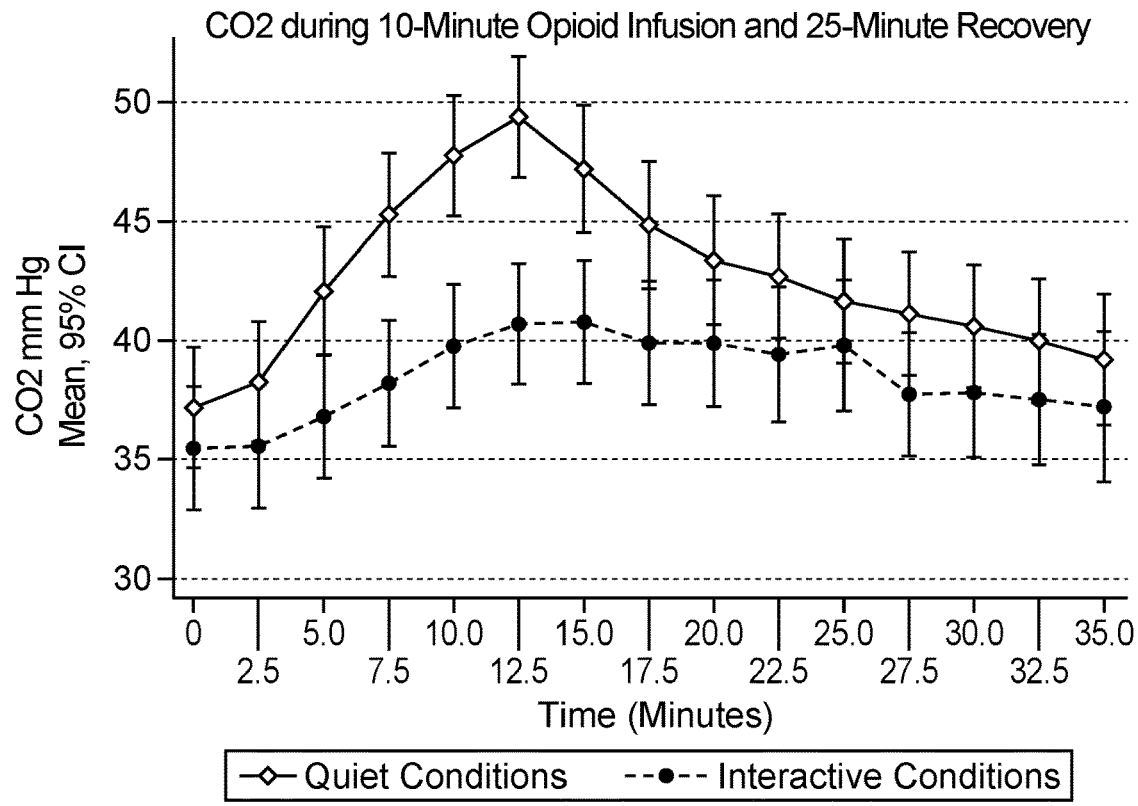
FIG. 2: Transcutaneous $CO_2$ increase was more pronounced during the non-interactive versus interactive experiments, differing significantly starting at 5 minutes into the remifentanil infusion. Mean transcutaneous $CO_2$ measurements during the 10-minute remifentanil infusion and 25-minute recovery period. Respiratory depression was more pronounced during the quiet versus interactive conditions, with $CO_2$ increasing 37% versus 21% above baseline values respectively (p=0.0002).
Figure 9A:
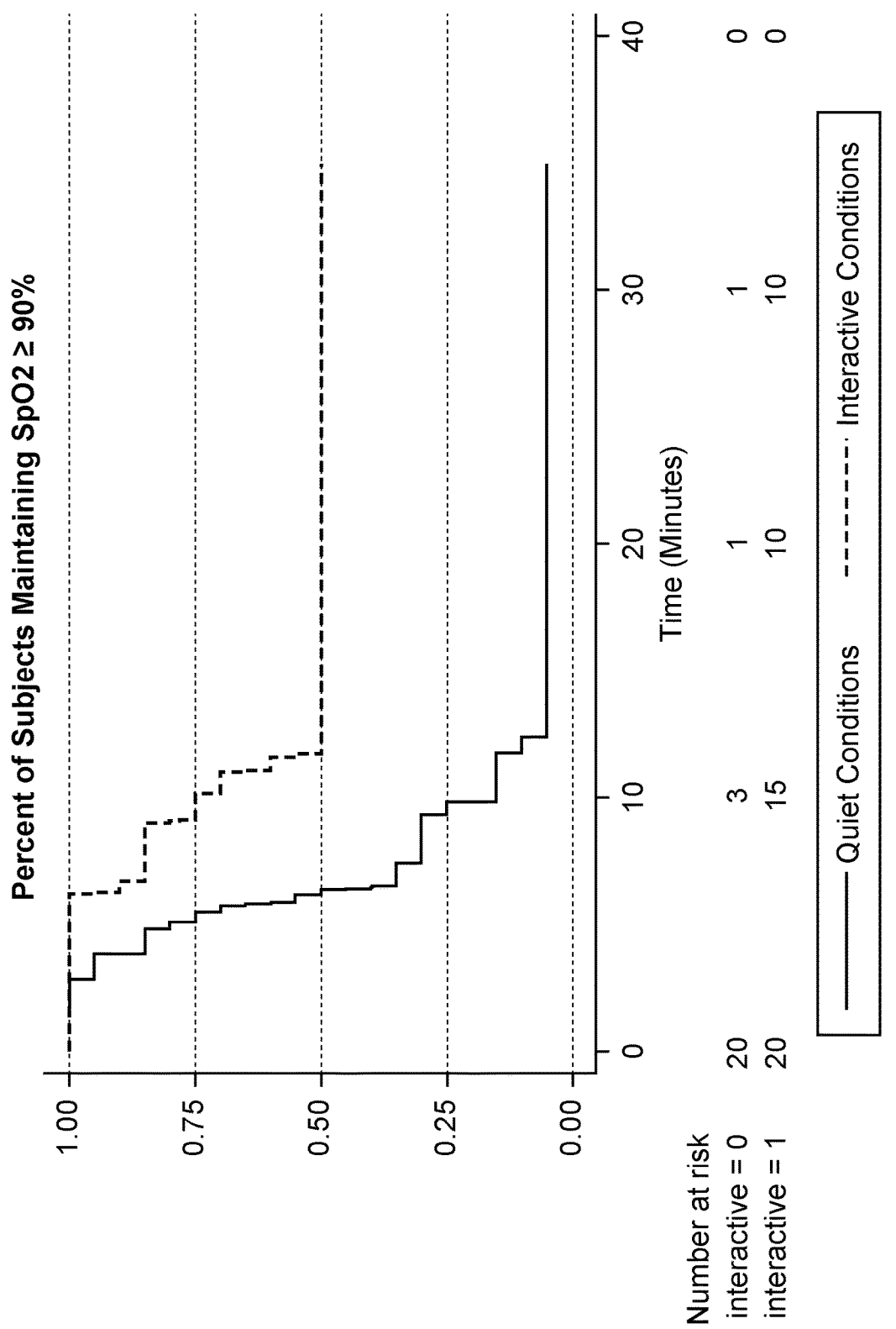
FIG. 9A: During identical opioid infusion protocols, oxyhemoglobin desaturation occurred more frequently (in 19/20 in versus 10/20 subjects) and earlier (median onset 6.2 versus 9.6 minutes) under quiet compared to interactive conditions (HR 0.135, P<0.001, conditional Cox regression) in each subject (paired data). In contrast to respiratory outcomes, PUAL decline did not differ under quiet versus interactive conditions.
Figure 9B:
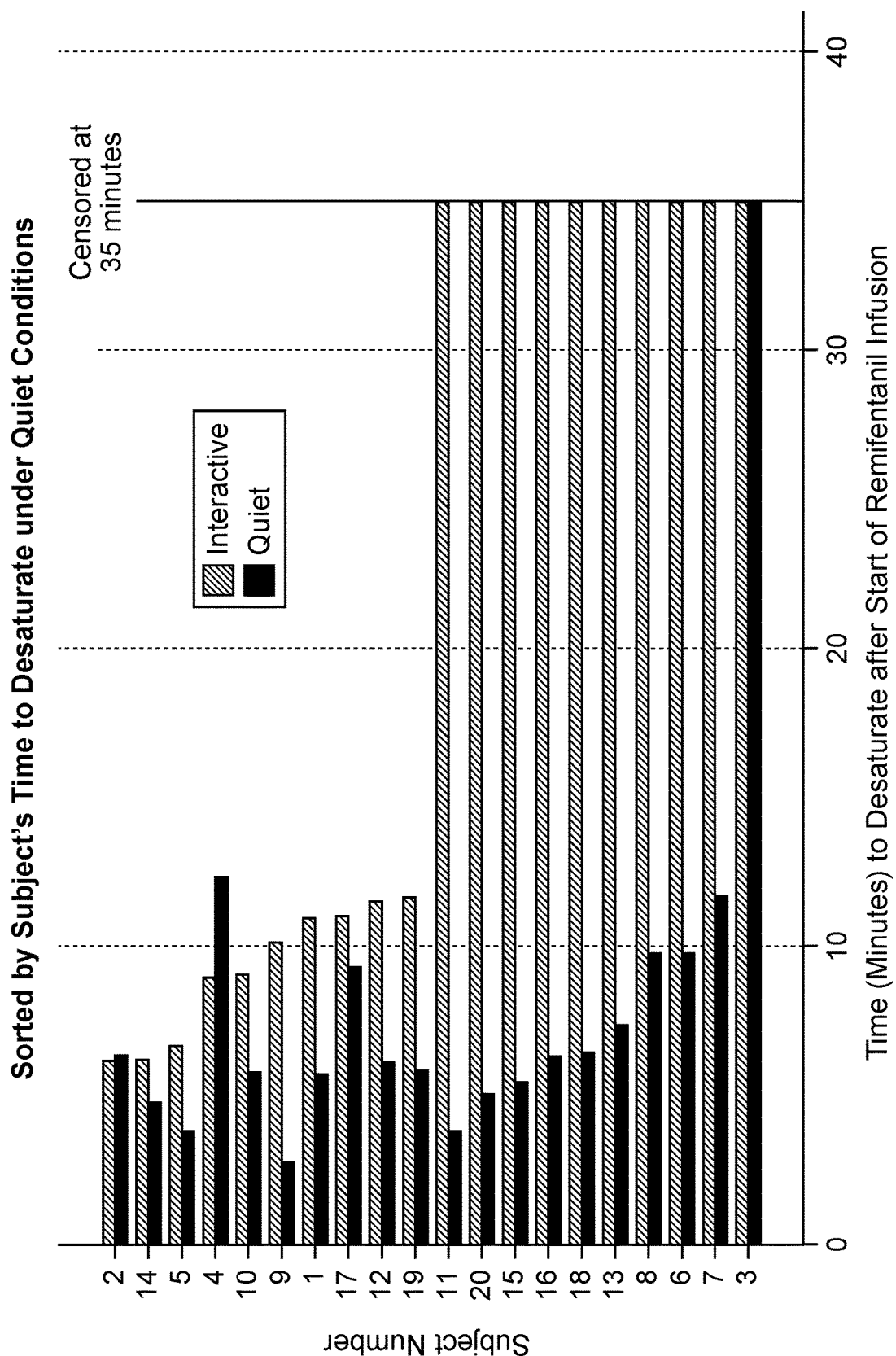
FIG. 9B: This figure depicts individual paired data, showing onset of oxyhemoglobin desaturation in each subject under quiet and interactive conditions.

Respiratory Outcomes Under Quiet Versus Interactive Conditions:

As the remifentanil infusion progressed, signs of OIRD were more frequent and pronounced under quiet versus interactive conditions. $CO_2$ increased ≥15% above baseline in 20/20 versus 14/20 subjects (McNemar Exact p=0.0312), ventilatory rate fell below 10 breaths per minute in 18/20 versus 5/20 subjects (McNemar Exact p=0.0002, Table 6), the highest observed $CO_2$ was significantly greater (50.8 versus 43.4 mm Hg, Wilcoxon signed-rank test p<0.0001, FIG. 2), and the proportional $CO_2$ increase above baseline was higher (37.5% versus 21.3%, p=0.0002, Table 6) compared to interactive conditions. Oxyhemoglobin desaturation occurred more often during quiet versus interactive conditions (in 19/20 versus 10/20 subjects, McNemar Exact p=0.0039), and Conditional Cox regression confirmed that under interactive conditions, desaturation occurred at later time points (median time to desaturate=9.6 [6.4-11.4] versus 6.2 [5.4-8.0] minutes, Hazard Ratio=0.135 [0.054-0.339], p<0.001, FIGS. 9A and 9B).

Relationship Between PUAL and Time (Representing Progressive Changes in Estimated Opioid Concentration)

Figure 3:
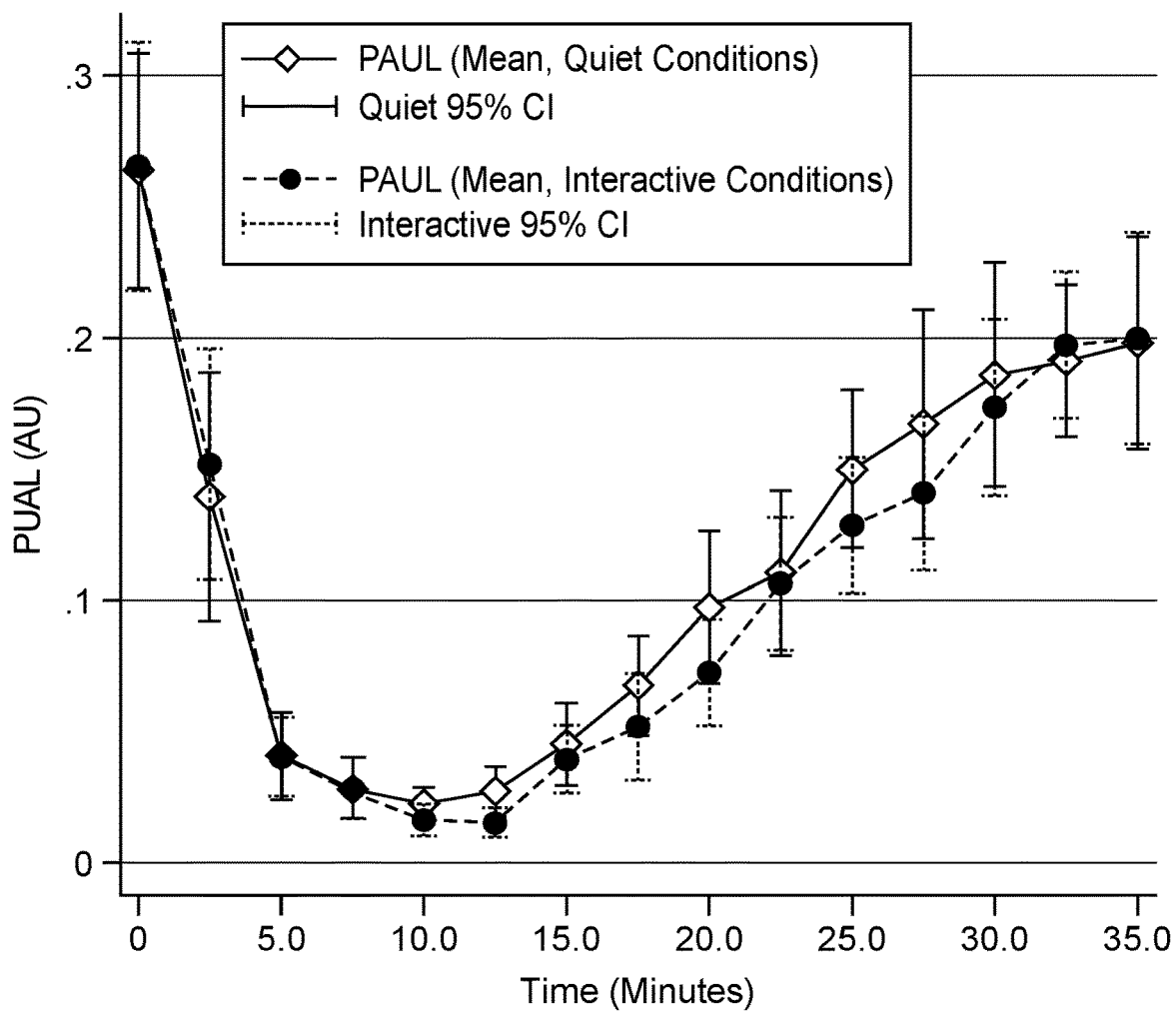
FIG. 3: PUAL declined consistently, in a dose-responsive manner, as opioid concentrations increased during the 10-minute remifentanil infusion. PUAL recovered incrementally after the 10-minute infusion was discontinued. In contrast to $CO_2$, PUAL was highly correlated with opioid exposure regardless of temporary, super-imposed stimulating effect of verbal interaction. PUAL declined progressively as opioid concentration increased during the 10-minute remifentanil infusion, from an average of 0.264 at baseline to 0.022 by 10 minutes under quiet conditions, and PUAL recovered as the infusion was discontinued (p<0.001). The relationship between PUAL and opioid exposure did not differ significantly under interactive versus quiet conditions, with mean PUAL difference (interactive–quiet)=−0.007 (−0.016 to 0.019), p=0.1240.
Figure 4:
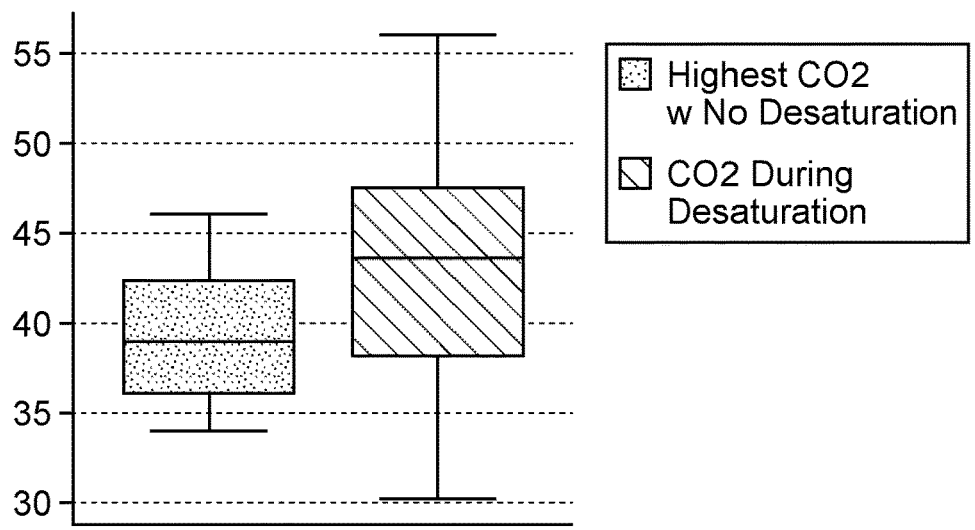
FIG. 4: Transcutaneous $CO_2$ was measured during 40 experiments among 20 subjects (20 subjects, each undergoing two experiments, once under quiet conditions and once under interactive conditions, in alternating sequence with each successive subject). The highest $CO_2$ among the 11 experiments during which desaturation did not occur showed significant overlap with the $CO_2$ readings that occurred at the point of desaturation among the 29 experiments during which desaturation occurred. The range of $CO_2$ readings concurrent with desaturation was broad, and in 9 subjects, desaturation occurred when $CO_2$ was not elevated, ranging between 30-39 mm Hg.
Figure 5:
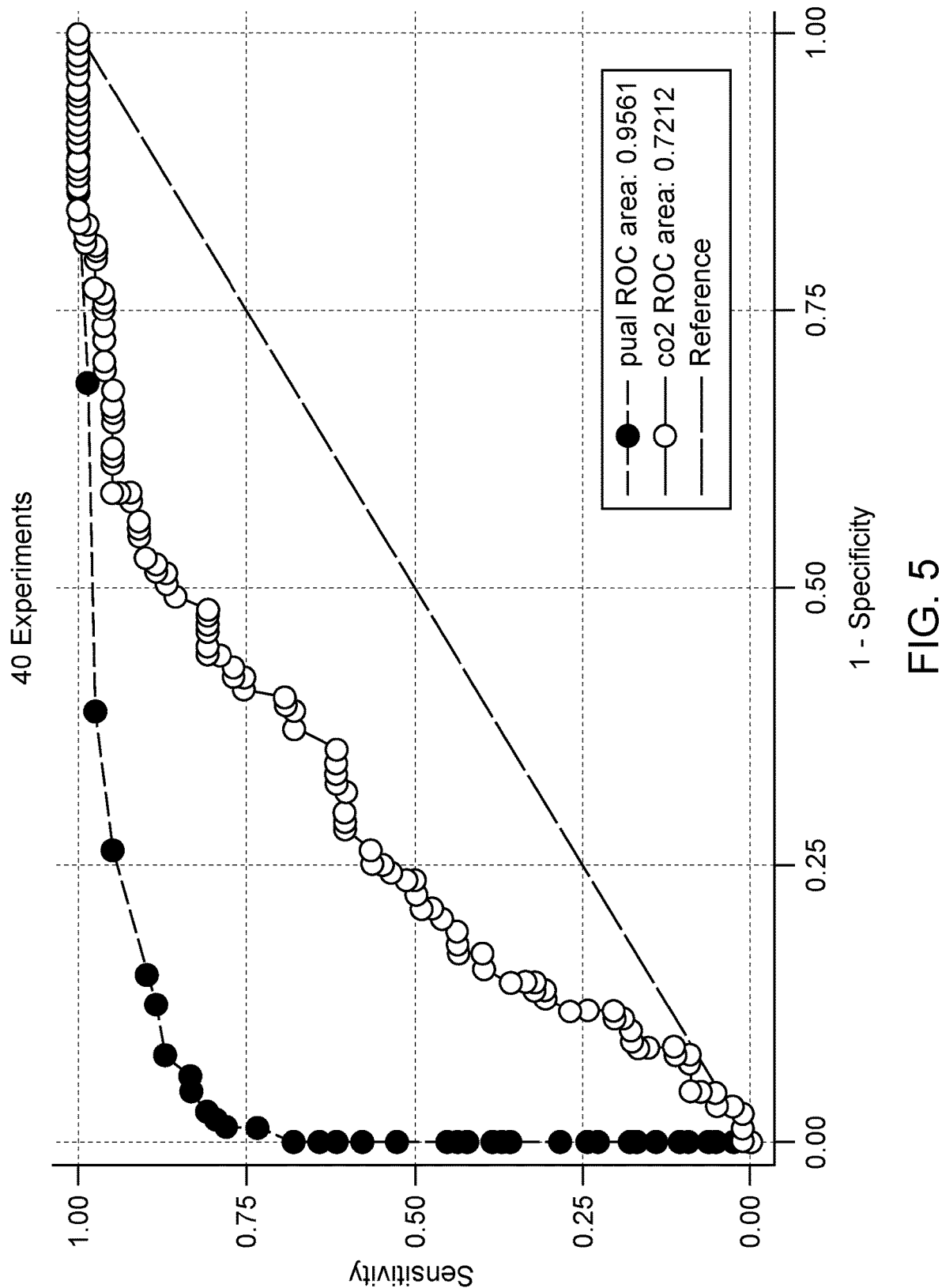
FIG. 5: A Receiver Operator Characteristic curve showing specificity and sensitivity of $CO_2$ and PUAL to detect high versus no-moderate (low-risk) opioid effect. PUAL showed excellent discrimination whereas $CO_2$ showed only fair discrimination for identifying high-risk versus low-risk opioid exposure.

During the remifentanil infusion (minutes 0-10), PUAL declined significantly at each 2.5-minute juncture as remifentanil concentration increased; under quiet conditions, from an average of 0.264 at baseline to 0.022 by 10-minutes (p<0.001, Table 7 and FIG. 3).

Pupil diameter likewise showed significant decline during these time intervals, but by a smaller percentage compared to PUAL (49.9%±6.4% diameter decline versus 95.1%±4.2% PUAL decline, t test p<0.0001, Table 7).

Figure 10:
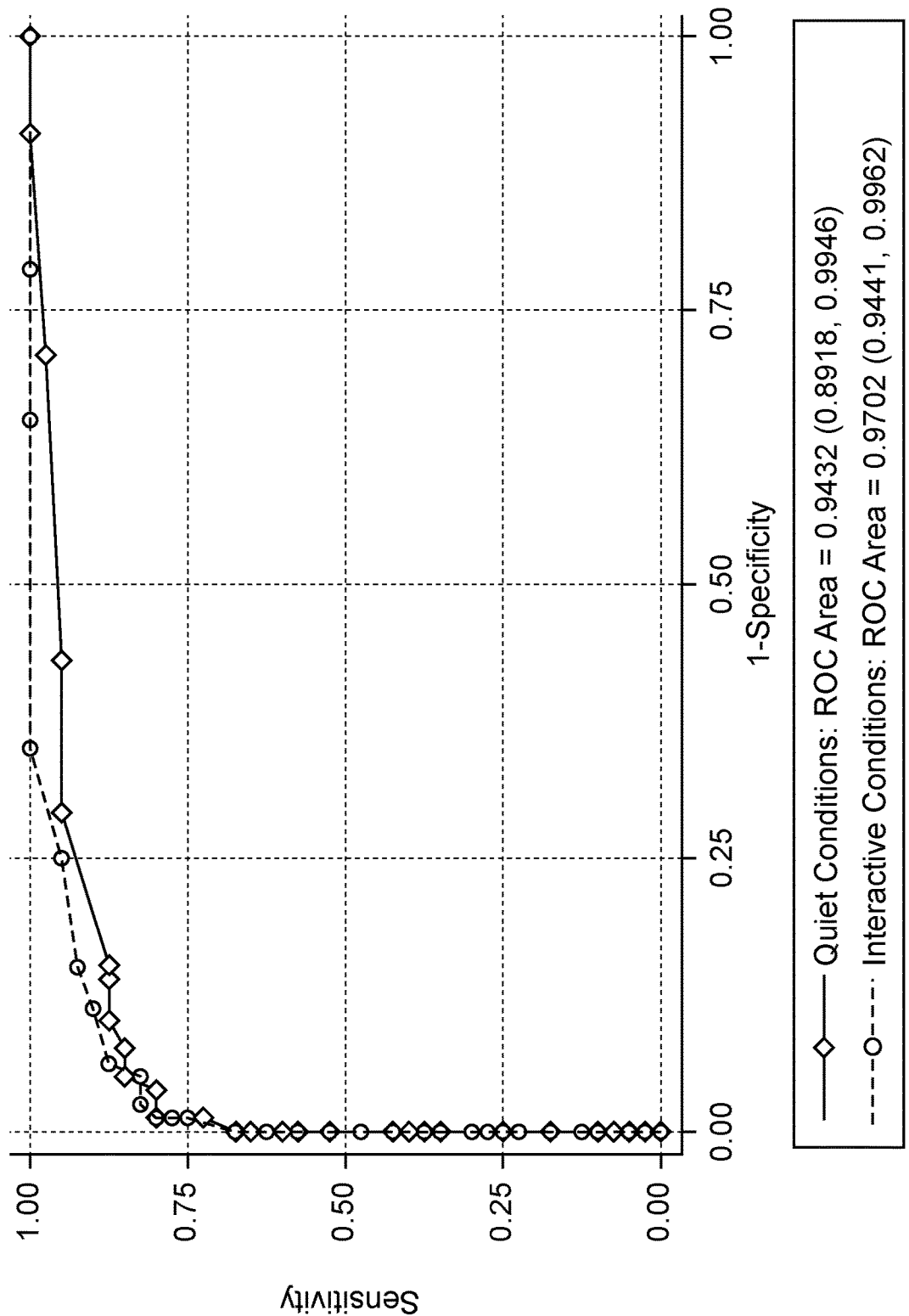
FIG. 10. In 20 subjects under quiet conditions, PUAL showed excellent discrimination between high versus absent-moderate opioid effect: AUROC=0.9459 (0.8957-0.9961) under quiet conditions and 0.9671 (0.9384-0.9958) under interactive conditions (p=0.3588 for difference in ROC area under the two conditions). Compared to PUAL, $CO_2$ showed lesser discrimination between high versus absent-moderate opioid effect: AUROC=0.8079 (0.7284-0.8874) under quiet conditions and 0.6501 (0.5480-0.7521) under interactive conditions (p=0.0202 for difference in $CO_2$ ROC area under the two contrasting conditions, p=0.0034 for difference between $CO_2$ versus PUAL ROC area under quiet conditions, and p<0.0001 for difference between $CO_2$ versus PUAL ROC area under interactive conditions).

PUAL discriminated well between high opioid effect (time points 5.0-12.5 minutes) and zero to moderate opioid effect (time points 0 and 2.5 minutes), with AUROC of 0.9459 (0.8957-0.9961) in the 20 quiet experiments and 0.9671 (0.9384-0.9958) in the 20 interactive experiments (FIG. 10). PUAL values ranging from 0.00-0.04 were associated with an interval likelihood ratio=14.6 (5.59 to 38.10) for high-dose opioid exposure, whereas values ≥0.13 were associated with an interval likelihood ratio=0.017 (0.004 to 0.069). PUAL values >0.04 but <0.13 were indeterminant (LR=1.15, 0.706 to 1.861). Adding further support to associating 5.0 to 12.5-minute measurements with high opioid concentration, we noted that 26/29 (90%) of all desaturation events occurred between 5.0-12.5 minutes, while three occurred between 2.5-5.0 minutes.

Compared to PUAL, $CO_2$ was significantly weaker in identifying absent-moderate versus high opioid exposure, and the discrimination was influenced by level of stimulation. AUROC for $CO_2$ was 0.8079 (0.7284) during quiet

TABLE 6

Summary of respiratory outcomes stratified by interactive versus quiet condition.
Respiratory outcomes stratified by background experimental condition

| | Background condition | | | | |
|---|---|---|---|---|---|
| | Interactive | | Quiet | | |
| Measurement | n | (%) | n | (%) | P-value* |
| Oxyhemoglobin desaturation | 10 | (50.0) | 19 | (95.0) | 0.0039 |
| Respiratory depression (≥15% CO2 increase) | 14 | (70.0) | 20 | (100) | 0.0312 |
| Respiratory rate < 10/min | 5 | (25.0) | 18 | (90.0) | 0.0002 |
| | mean | (sd) | mean | (sd) | P-value** |
| Highest observed CO2, median (IQR) | 43.4 | (40.7, 46.1) | 50.8 | (47.6, 54.0) | <0.001 |
| Highest proportional increase in $CO_2$ above baseline (%) | 21.3 | (13.2) | 37.5 | (10.7) | 0.0002 |

*P-value calculated using two-tailed McNemar's exact test unless otherwise indicated
**P-value calculated using Wilcoxon signed rank test conditions versus 0.6501 (0.5480-0.7521) under interactive conditions (p=0.0202 for difference). By contrast, PUAL's discrimination did not differ significantly under either condition (p=0.3588).

Figure 11:
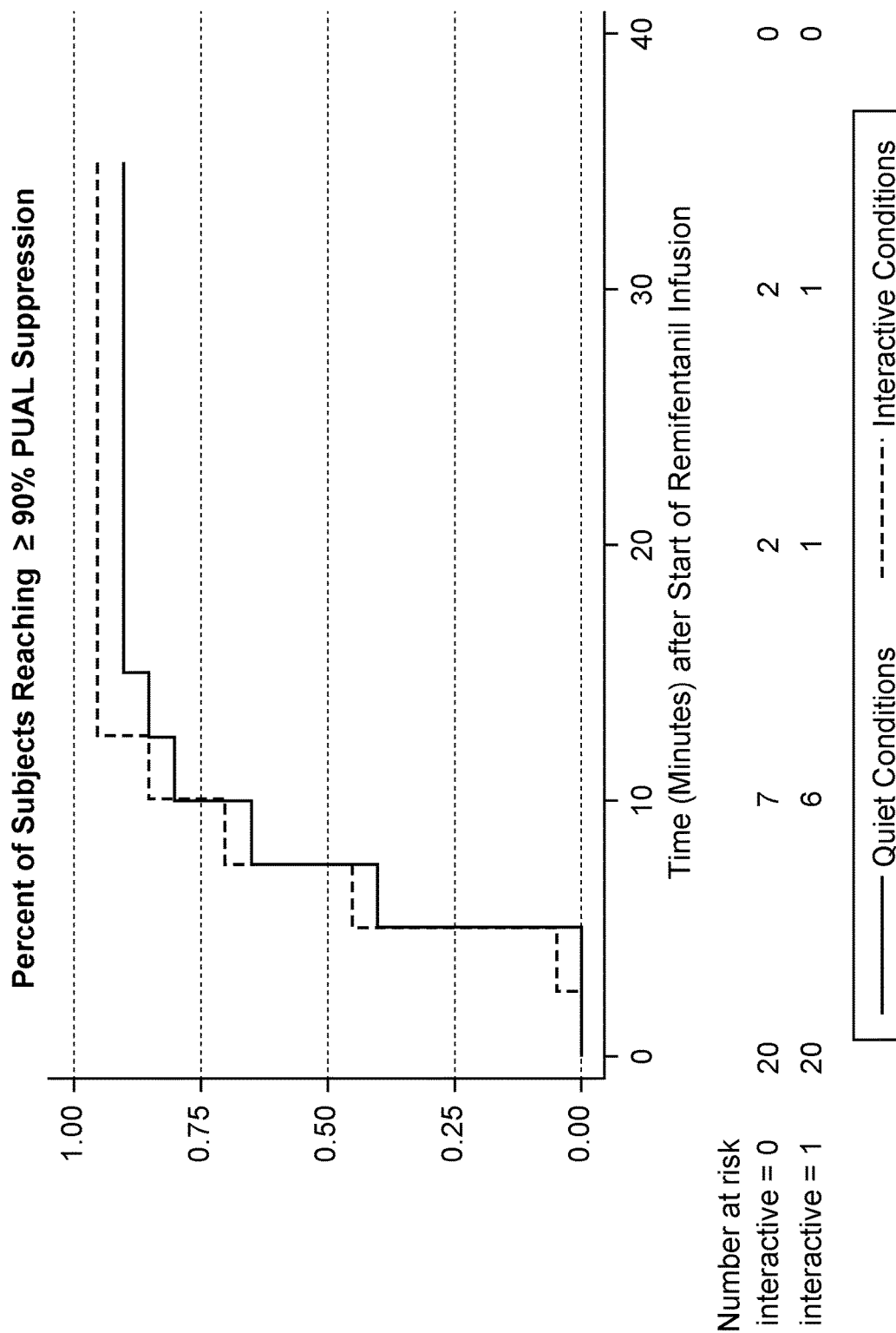
FIG. 11: The relationship between PUAL and opioid remained consistent and was unaffected by environmental stimulation. Overall, ≥90% PUAL suppression occurred in 19/20 of subjects during quiet conditions versus 18/20 of the same group of subjects during interactive conditions. The proportion of subjects reaching ≥90% PUAL suppression under each condition did not differ significantly, HR=1.193 (95% CI=0.624-2.278), p=0.593.
Figure 12:
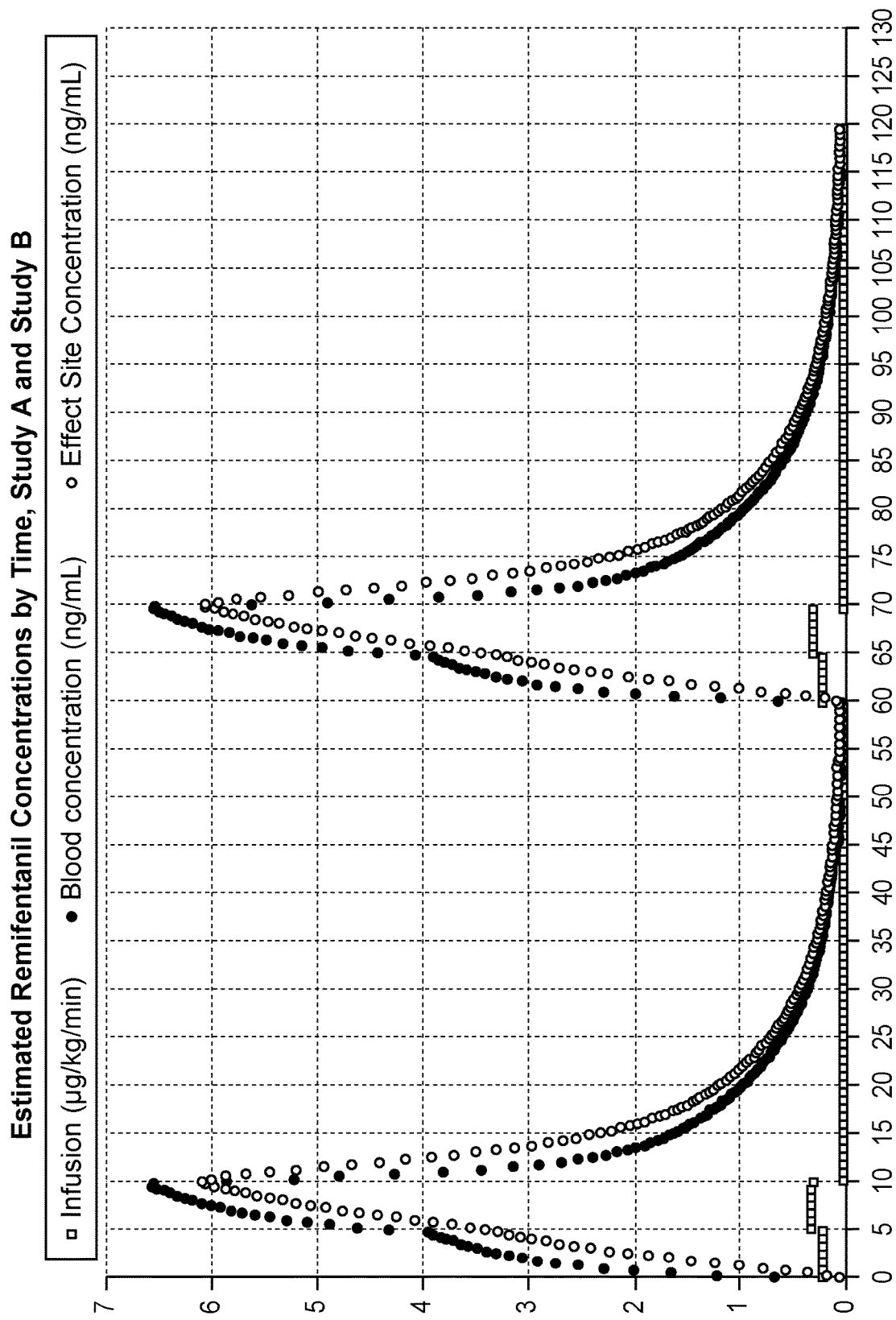
FIG. 12: Estimated remifentanil blood and effect site concentrations by time in Study A (interactive conditions) and Study B (quiet conditions). Left graph: Study A, right graph: Study B (Minto model).

PUAL suppression by 90% occurred in 18/20 quiet versus 19/20 interactive experiments (Hazard Ratio=1.193 [0.625-2.278], p=0.593, FIG. 11); average overall decline was 90(9)% at 10 minutes and 96(4)% at maximum suppression (Table 7). Mixed Effects regression showed a mean difference (interactive−quiet) under contrasting conditions of −0.007 (−0.016 to 0.019, p=0.1240) during the 35-minute experiment.

TABLE 7

Summary of pupillary findings, under interactive and quiet conditions. PUAL and pupil diameter measurements under interactive and quiet conditions

| Measurement | Interactive | | Quiet | | p-value |
|---|---|---|---|---|---|
| | mean | (SD) | mean | (SD) | |
| Pupillary Unrest (PUAL) | | | | | |
| Baseline PUAL (AU) | 0.265 | (0.107) | 0.263 | (0.102) | 0.987 |
| PUAL (AU) after 5 minutes of infusion | 0.040 | (0.034) | 0.041 | (0.037) | 0.930 |
| PUAL (AU) after 10 minutes of infusion | 0.016 | (0.014) | 0.022 | (0.014) | 0.183 |
| Lowest PUAL (AU) during experiment | 0.008 | (0.010) | 0.010 | (0.008) | 0.542 |
| Percent PUAL decline at 5 minutes | 82.0 | (16.0) | 81.2 | (18.4) | 0.974 |
| Percent PUAL decline at 10 minutes | 93.3 | (6.0) | 90.0 | (9.2) | 0.187 |
| Maximum percent PUAL decline | 96.4 | (5.0) | 95.8 | (4.0) | 0.678 |
| Pupil Diameter | | | | | |
| Baseline diameter (mm) | 4.4 | (0.5) | 4.3 | (0.6) | 0.571 |
| Diameter (mm) at 5 minutes of infusion | 2.5 | (0.4) | 2.5 | (0.4) | 1.000 |
| Diameter (mm) at 10 minutes of infusion | 2.2 | (0.2) | 2.2 | (0.2) | 1.000 |
| Lowest diameter during experiment | 2.2 | (0.2) | 2.1 | (0.2) | 0.122 |
| Percent diameter decline at 5 minutes | 42.5 | (9.5) | 41.0 | (10.4) | 0.692 |
| Percent diameter decline at 10 minutes | 49.9 | (6.6) | 48.1 | (6.6) | 0.394 |
| Maximum percent diameter decline | 50.5 | (6.2) | 49.3 | (6.9) | 0.566 |

*P-values were calculated by paired t-test. PUAL and pupillary diameter measurements at 5-minutes and 10-minutes after the start of the remifentanil infusion and at maximum parameter decline all differed significantly from their respective baseline values, p < 0.0001.

As the remifentanil infusion progressed, moderate respiratory depression (defined as increase in $CO_2$ increase of ≥15% above baseline) occurred more often in the non-interactive Study B (in 20/20 subjects) versus interactive protocols (in 14/20 subjects in Study B, Fisher exact p=0.02). Significantly, respiratory depression with oxyhemoglobin desaturation occurred significantly more often in the non-interactive versus interactive experiments (in 19/20 subjects in Study B versus 10/20 subjects in Study A, Fisher exact p=0.003). Oxyhemoglobin desaturation also occurred more quickly after initiation of the remifentanil infusion in the non-interactive study, approximately two minutes sooner in Study B versus Study A (409±159 versus 557±132 seconds, P=0.0179). With desaturation taking place at later time-points in the interactive Study A, the average PUAL value and pupil diameter at the time of desaturation were somewhat lower in the interactive experiment (Table 3). Average overall $CO_2$ increase was also greater in the non-stimulating experiment (13.80±4.25 versus 7.41±4.41 mm Hg in Study B versus Study A, P<0.0001). The percent increase in $CO_2$ above baseline was >50% higher in the non-interactive versus interactive studies (37% versus 21% in Study B versus Study A, paired t-test t-statistic=32, p<0.0001). Multiple logistic regression showed significant association between desaturation and maximum increase in $CO_2$ (LR chi2 176, pseudoR2=0.4468, P<0.0001). Univariate and multivariate regression showed significant correlation between greater $CO_2$ increase and the time interval from initiation of remifentanil until first episode of oxygen desaturation. The $CO_2$ increase was not sensitive as an indicator of desaturation risk; there was a small difference between highest $CO_2$ among subjects who did not desaturate versus $CO_2$ coinciding with desaturation in the experiments where desaturation occurred, but it did not reach statistical significance (39.68 [36.98-42.39] versus 43.47 [41.02-45.93] mm Hg, p=0.0739).

During the infusion phase of the interactive experiments, highest POSS scores were more often >1 among the subjects who desaturated as opposed to the subjects who did not desaturate, but the difference was not statistically significant (Kruskall Wallis equality-of-populations rank test chi2=3.167 with 1 dF, p=0.0752).

Recovery Phase (Remifentanil Off, 10-35 Minutes after Start of Infusion):

At 10 minutes, when the remifentanil infusion was discontinued, PUAL had declined 95% from baseline values, to near zero in most subjects, and magnitude of decline did not differ between studies A versus B. The PUAL increase during the 25-minute recovery period, when estimated opioid concentrations were declining, was highly significant (F-statistic=40.08 with 394 dF, Bartlett chi2=122.03, p<0.001). Mean PUAL values were lower at 35 minutes compared to baseline in both Run 1 and Run 2, but PUAL values continued to recover during the 30-minute rest period, to the point that PUAL did not differ from time of remifentanil initiation in the first versus second infusion.

Example 2—Development of the Opioid Detection and Stratification System

In a cross-over study design, healthy volunteers receiving intravenous remifentanil experienced greater respiratory depression and more frequent oxyhemoglobin desaturation when the infusion was conducted in a non-stimulating versus stimulating, verbally interactive setting. In contrast to respiratory outcomes, the decline in PUAL did not differ between these two environments. Increasing opioid exposure was significantly and dose-dependently correlated to decline in PUAL. In contrast to respiratory outcomes, PUAL decline concurrent with progressive remifentanil infusion did not differ under interactive versus quiet conditions.

All subjects demonstrated functional evidence of opioid action at the level of the mid-brain by consistent obliteration and subsequent recovery of PUAL in parallel with the rise and fall of opioid concentration. The delayed onset and lesser incidence of desaturation in the interactive setting supports the concept that cortical activity augments respiratory drive, although the effect may be temporary, and can be eventually overtaken by opioid's depressant effect as opioid concentration continues to increase. In clinical settings, common forms of stimulus that can conceal signs of opioid's depressant effect on brainstem-related ventilatory drive include pain or periodic interaction with caregivers. A clinical scenario illustrating this concept is that of a patient with severe, persistent pain despite extensive treatment with opioids, who subsequently develops abrupt respiratory arrest after receiving effective neuraxial or peripheral nerve block with local anesthetic as a rescue strategy. This concept also explains the previously described phenomenon of concealed OIRD, in which an opioid-treated hospitalized patient exhibits seemingly normal physiologic parameters, but when left alone, undergoes respiratory arrest even in circumstances where additional opioid has not been given.

OIRD is difficult to anticipate on the basis of formulas, and published cases of ICU-associated OIRD suggest that conventional clinical parameters are collectively insensitive as OIRD signals. Responsiveness to the analgesic and depressant effects of opioid medication varies significantly between individuals, making OIRD difficult to anticipate purely based on opioid treatment dose. The apparent unexpectedness of respiratory arrest reported in the published literature suggests that the signs of opioid toxicity that clinicians currently rely upon, including level of consciousness, ventilatory rate, and even $CO_2$ are not adequately sensitive as indicators of opioid effect or imminent respiratory decompensation. Although POSS scores are often documented in clinical practice, these were not sensitive as indicators of opioid effect or respiratory decline in our protocol; of the 10/20 subjects with RDD, 8 of 10 subjects had POSS scores no higher than 1 throughout the infusion and recovery periods. Continuous pulse oximetry (CPO) is frequently advocated to detect OIRD among hospitalized patients. According to protocol described in Example 1, when $SpO_2$ readings fell to 90%, the $FiO_2$ was immediately raised; in all cases, the saturation rose and remained at acceptable levels (≥92%). However, the decline in $SpO_2$ from clinically acceptable (95-100%) to hypoxic ranges occurred within seconds, even when the $FiO_2$ increase was immediately performed as $SpO_2$ reached 90%. In a CPO unit, this abrupt transition from normal to marginal $SpO_2$ would require an intervention response-time on the order of seconds to prevent profound, sustained hypoxia in a patient with opioid responses of similar magnitude to the subjected tested in Example 1; outside of an operating room, this response-time would seem unrealistic. The prompt $SpO_2$ correction with modest increase in $FiO_2$ underscores the fact that OIRD may go unrecognized in a clinical setting during use supplemental oxygen if OIRD detection relies on $SpO_2$. Continuous capnography has also been suggested as a measure to detect OIRD. Although $CO_2$ increase was highly correlated with increased estimated opioid concentration and probability of desaturation, these measurements were sporadic, and a broad range of values were observed at the time coinciding with oxygen desaturation. Although respiratory rate <10/minute occurred more frequently in subjects experiencing desaturation, this threshold was less sensitive than ≥15% $CO_2$ increase as a predictor. With rising $CO_2$ and opioid exposure, an irregular pattern of ventilation as opposed to simple decline in rate, was observed, underscoring the limited sensitivity of respiratory rate in lieu of $CO_2$ to indicate OIRD.

In contrast, pupillary measures were highly sensitive to opioid increase and onset of respiratory depression. While pupil diameter decline was highly correlated with increasing estimated opioid concentrations, PUAL became nearly obliterated as opioid concentration increased. Although both measures were sensitive, PUAL's utility as a clinical marker is arguably greater. Diameter is an interval measurement, lacking an unambiguous, lower-limiting value. PUAL not only has a greater effect size, but also a ratio scale that includes a definitive lower-limiting value. PUAL decline was robust, consistent and predictable, becoming close to 100% obliterated as opioid concentration increased, and returning to baseline values within one hour as estimated opioid concentration declined toward zero.

Although both PUAL and pupillary diameter were sensitive to increasing opioid concentration, their potential utility as a clinical marker for opioid effect differs significantly. Pupil diameter is an interval measurement, without an unambiguous, lower-limiting value. The practicality of PUAL may be greater, not only because the magnitude of change is greater compared to diameter change with increasing opioid concentration, but because as a ratio value, it has a definitive lower-limiting value of zero.

The respiratory depressant effect of opioids can be partially antagonized by environmental factors such as conversation and engagement in cognitive activity. Presumably, these maneuvers activate neocortical pathways that excite the respiratory control centers in the brainstem. While active engagement with an opioid-medicated subject may enhance breathing, the impact of opioids on PUAL cannot be overcome by the same interaction. In the presence of high-dose opioid, differential block of pathways may contribute to maintenance of ventilatory drive. In the brainstem pathway, indicated by decline in inhibition of the EW nucleus and suppression of PUAL, the antagonism is consistent and highly correlated with opioid intoxication. On the other hand, in pathways initiating in the cerebral cortex, influenced by behavioral interaction, activity remains partially intact when the subjects remain conscious. These concepts are consistent with recent studies that have shown that under incrementally increased propofol hypnosis, PUAL values remain within normal ranges until a subject becomes completely unresponsive. Although activity in several brain centers have been associated with pupillary responses, the final inhibitory pathway in the EW nucleus that is blocked by opioids is not known.

The disclosure provides methods of managing opioid treatment for pain management. Catastrophic respiratory depressant effects can develop in patients treated with opioids; low or absent values of PUAL will identify patients at risk for deterioration who warrant additional precautions, especially in circumstances where environmental or noxious stimulation might be abruptly withdrawn.

Figure 13:
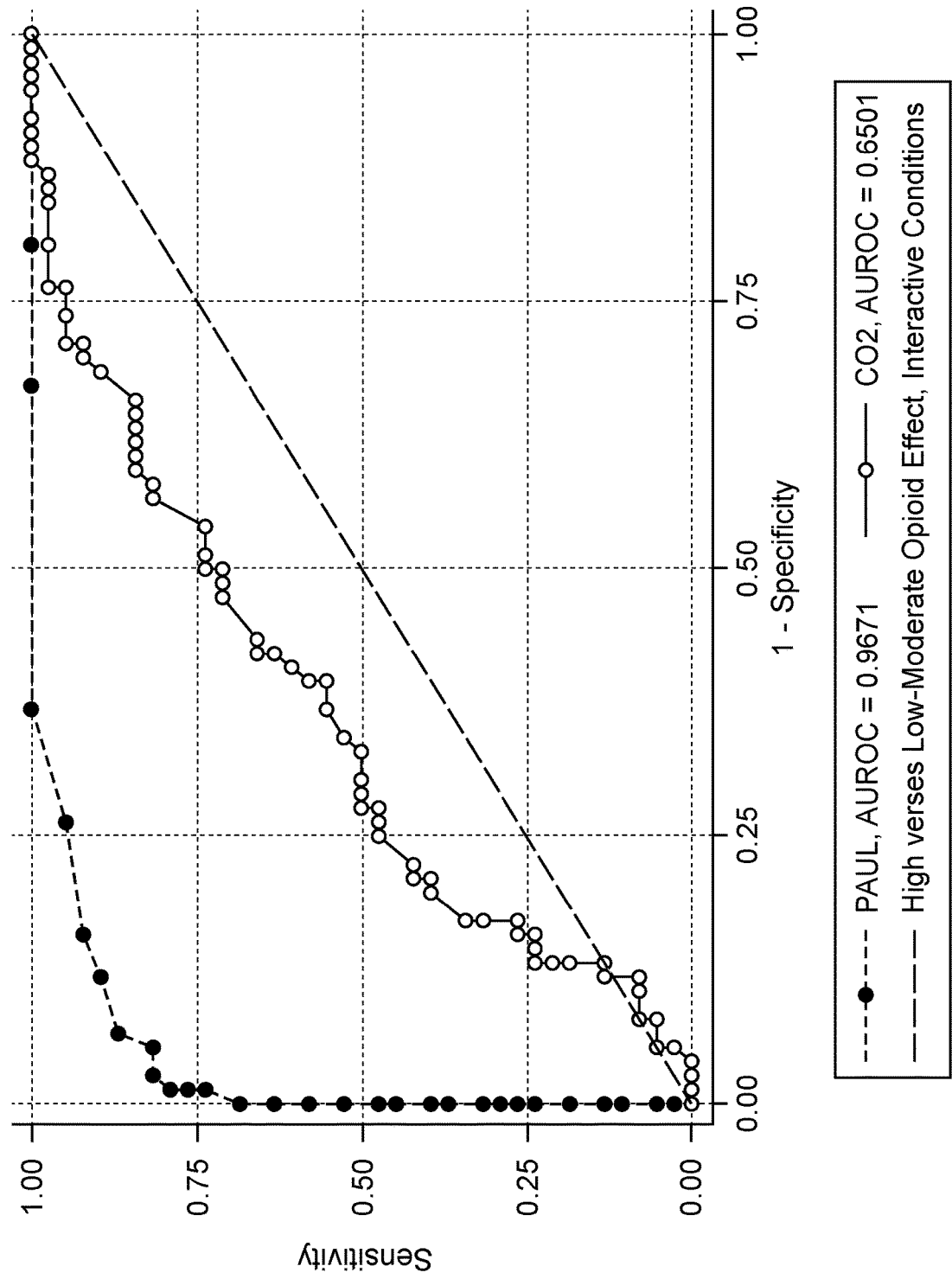
FIG. 13: Opioid Exposure: Discrimination between high-risk, low-risk, and indeterminant-risk opioid effect. Comparison of $CO_2$ versus PUAL during interactive conditions to distinguish between these risk conditions, with PUAL showing excellent discrimination and $CO_2$ showing poor discrimination.
Figure 14:
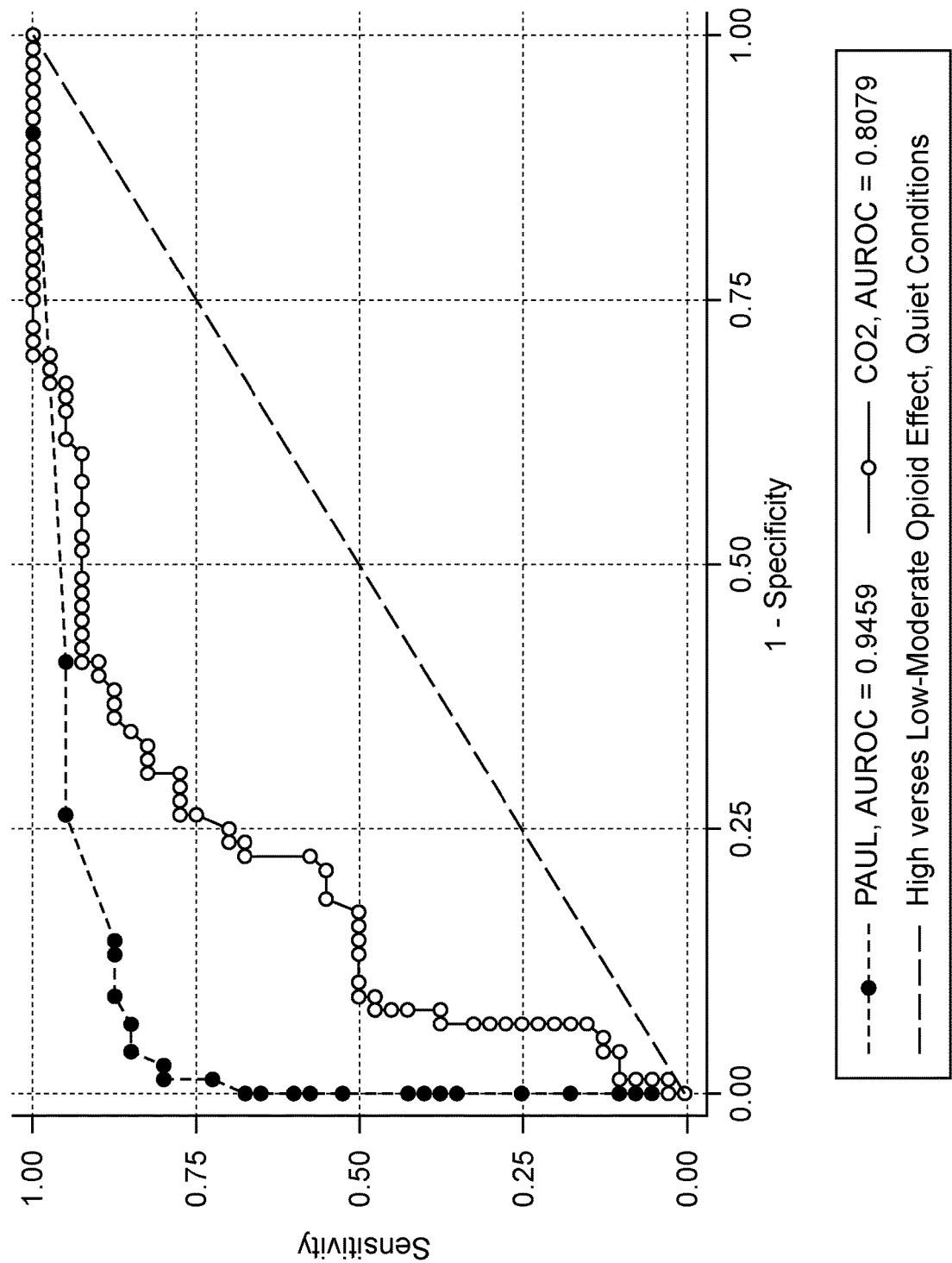
FIG. 14: Opioid Exposure: Discrimination between high-risk, low-risk, and indeterminant-risk situations. Comparison of $CO_2$ versus PUAL during quiet conditions with PUAL showing excellent discrimination and $CO_2$ showing fair to good discrimination.
Figure 15A:
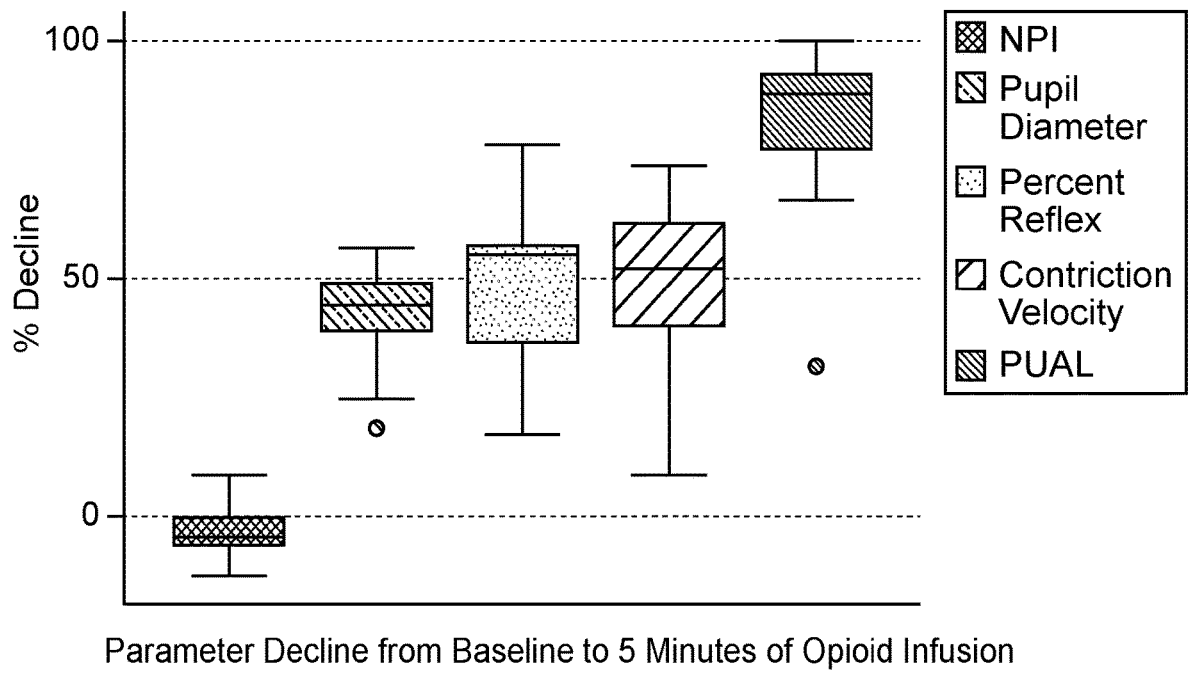
FIG. 15A: Response of other pupillary parameters to opioid exposure. Pupil diameter, percent reflex, constriction velocity, and neurological pupil index (NPI) were measured 5 minutes after remifentanil infusion. Mean (SD) Estimated Effect Site Concentration=2.7 (0.4) ng/mL.
Figure 15B:
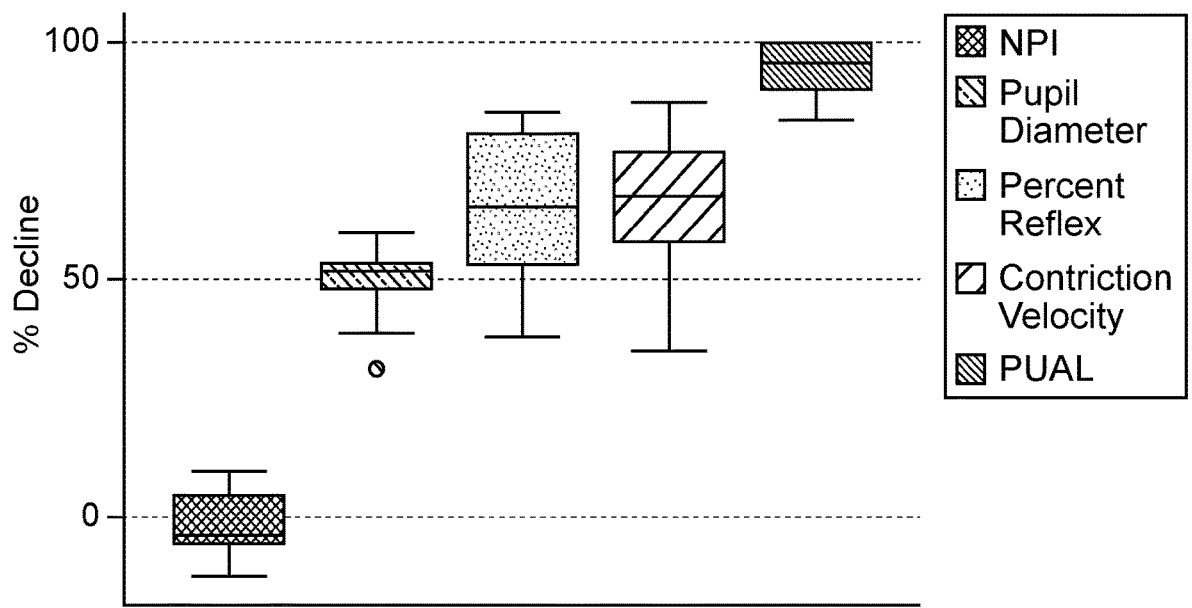
FIG. 15B: Response of other pupillary parameters to opioid exposure. Pupil diameter, percent reflex, constriction velocity, and neurological pupil index (NPI) were measured 10 minutes after remifentanil infusion. Mean (SD) Estimated Effect Site Concentration=4.9 (0.7) ng/mL.
Figure 16:
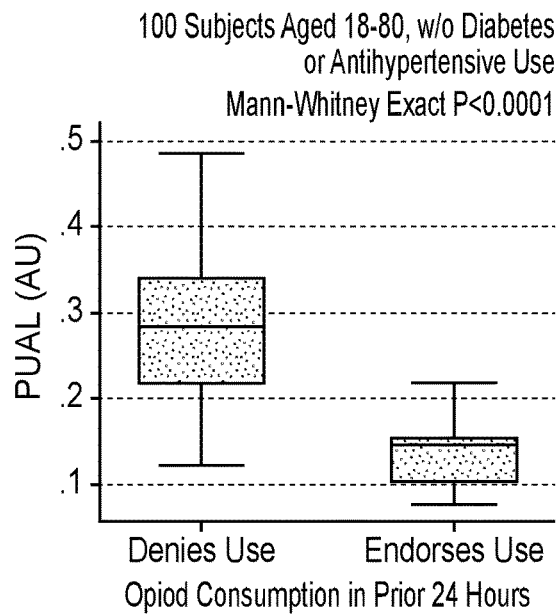
FIG. 16: PUAL in 100 ambulatory subjects age 18-80 years who endorsed or denied opioid use within 24 hours prior to PUAL measurement. Subjects endorsed having no history of diabetes, eye disease or concurrent use of ocular or antihypertensive medications. Note that among 94 subjects denying opioid consumption, 0/94 had PUAL values in the high-risk range, only 1/94 had PUAL values in the indeterminant range (0.123), and the remaining 93/94 were in the low-risk range. Among subjects endorsing opioid use, 2/6 had PUAL in the indeterminant range (0.078 and 0.103) and 4/6 were in the low-risk range.
Figure 17:
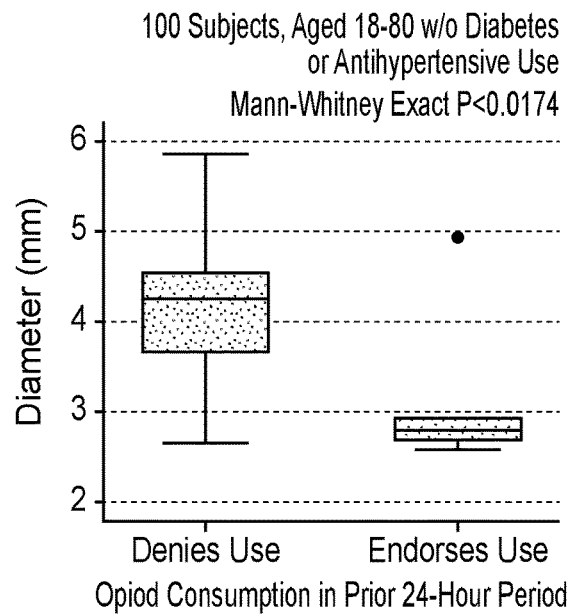
FIG. 17: Pupil diameter from 100 ambulatory subjects age 18-80 years who endorsed or denied opioid use within 24 hours prior to pupillary measurement. Subjects endorsed having no history of diabetes, eye disease or concurrent use of ocular or antihypertensive medications.
Figure 18A:
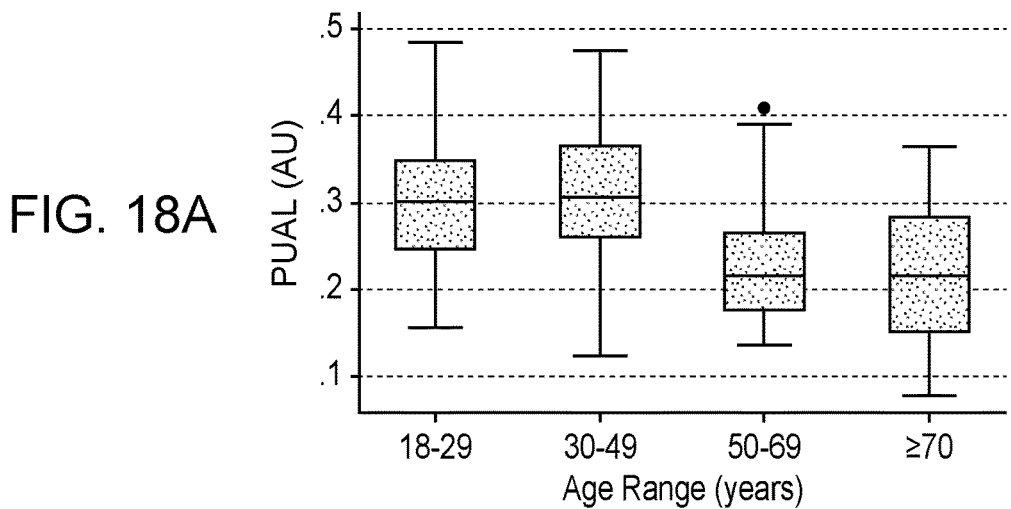
FIGS. 18A-18B: PUAL and pupil diameter from 100 subjects with the age range of 18-80 years. KW p=0.0001 for PUAL and KW p<0.0001 for pupil diameter.
Figure 18B:
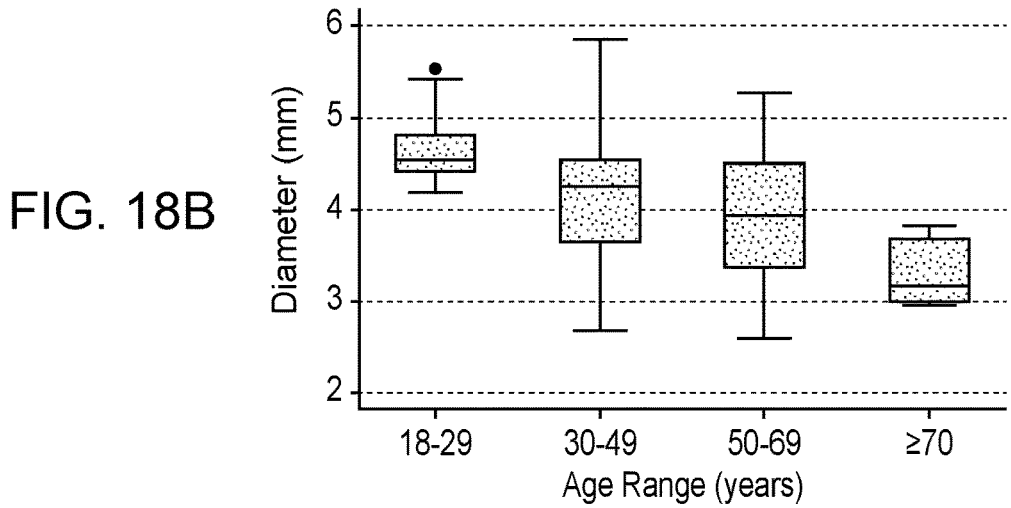
Figure 19:
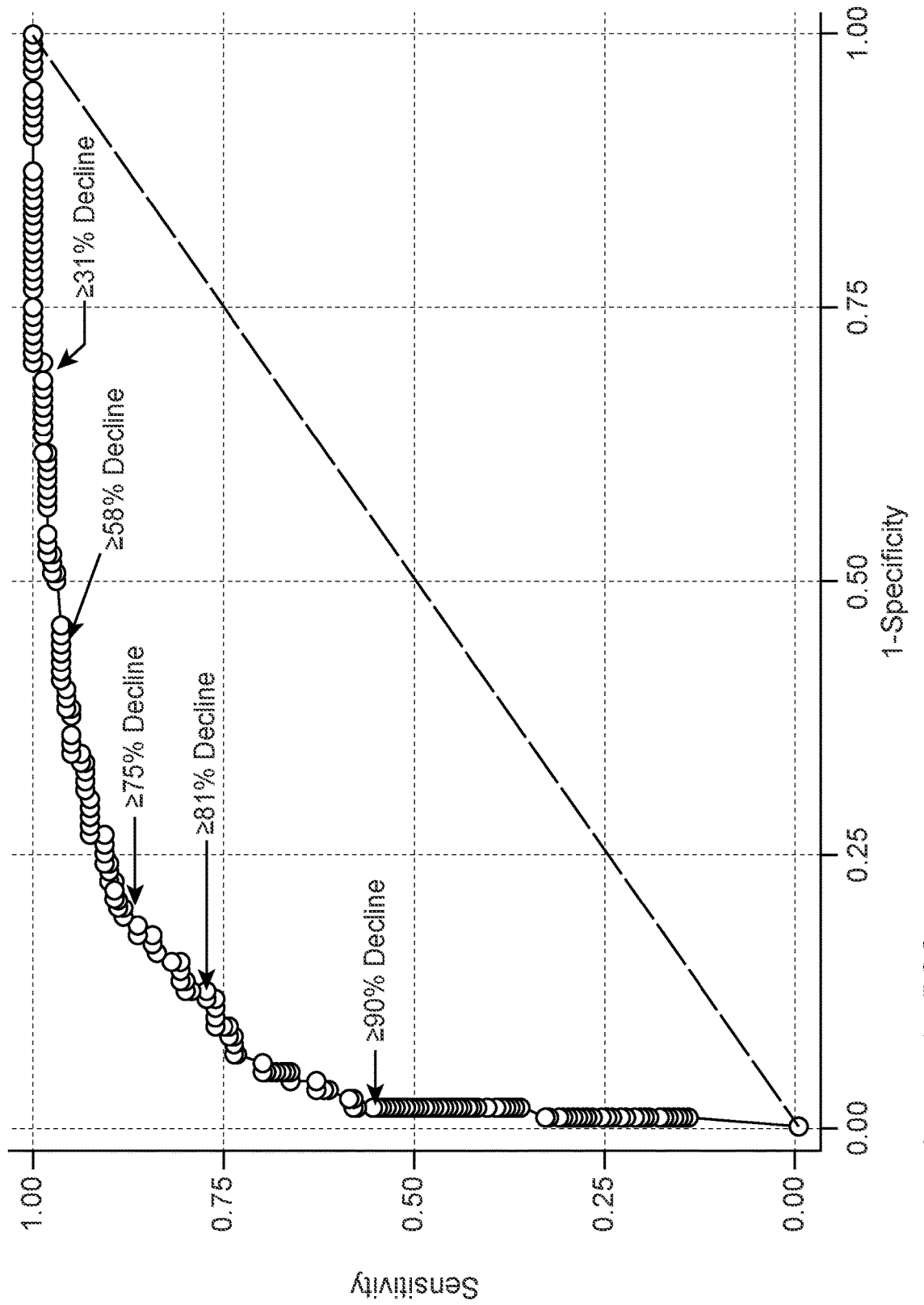
FIG. 19: PUAL decline from baseline value as a predictor of opioid risk and effects. PUAL decline at 5.0, 7.5, 10.0 and 12.5 minutes corresponds to the "high-level" exposure and PUAL decline at 2.5, 20, 22.5 and 25 minutes corresponds to "low-moderate level" exposure. Highest Risk: PUAL decline ≥90%, +LR=34.50, −LR=0.43, sensitivity=57.50%, specificity=98.33%. Very High Risk: PUAL decline 81%, +LR=6.05, −LR=0.22, sensitivity=80.62%, specificity=86.67%. High Risk: PUAL decline 75%, +LR=4.60, −LR=0.15, sensitivity=88.12%, specificity=80.83%. Moderate Risk: PUAL decline 58%, +LR=2.31, −LR=0.06, sensitivity=96.25%, specificity=58.33%. Low Risk: PUAL decline 31%, +LR=1.43, −LR=0.00, sensitivity=100%, Specificity=30%.

Example 3—an Example of the Opioid Detection and Stratification System with Three Risk Levels of Opioid-Related Adverse Event Baseline PUAL in 20 young adult healthy subjects was 0.264±0.103 AU, and 0.283±0.083 among a mixed age ambulatory subjects comprised of patients and visitors to the outpatient preoperative clinic. From the remifentanil infusion study of 20 healthy volunteers, the remifentanil was administered at a moderate rate for 5 minutes followed by a higher rate for the subsequent 5 minute period. Estimated remifentanil concentrations at effect site were calculated for each of the subjects, and anticipated profound effect in a window of time between 5-12.5 minutes after start of the drug infusion. This estimate was consistent with subsequent events, wherein apnea and oxyhemoglobin desaturation occurred frequently and exclusively within this time window. As PUAL was measured every 2.5 minutes, measurements taken at 5, 7.5, 10, and 12.5 were considered to correlate with periods of high opioid measures taken from 5-12.5 minutes to correlate with high intensity opioid effect and high risk of opioid-induced respiratory depression. Conversely, PUAL values measured at baseline and 2.5 minutes were considered to be correlated with none to moderate opioid effect and low to moderate risk of respiratory depression. The Receiver Operator Characteristic curves (FIGS. 10, 13, and 14) demonstrate PUAL's excellent discrimination of these two contrasting conditions. Cut-offs were identified as follows: 1: If PUAL is >0.13 AU, there would negligible risk of opioid induced respiratory depression (OPDESS score=1), with a likelihood ratio=0.017 (0.004, 0.069); 2: If PUAL is >0.04 but ≤0.13, there is indeterminant risk of opioid-induced respiratory depression, with a likelihood ratio=1.15 (0.71, 1.86); 3: If PUAL is 0-0.04, there is evidence of profound opioid effect and risk of imminent or delayed opioid-induced respiratory depression, with a likelihood ratio=14.60 (5.59, 38.10).

For a patient with a score=3 and clinical evidence of persistent pain, the clinician can perform the following steps:
1: Ensure that the patient is receiving adequate support and monitoring so that profound respiratory depression can be recognized and mitigated (implementation of continuous monitoring, consideration of supplemental oxygen administration).
2: Interpret the score in clinical context and consider the possibility that the patient may have an unusually low PUAL even in the absence of opioid exposure, possibly due to uncommon conditions causing constriction or fixation of the pupil including advanced diabetic neuropathy, Addie's pupil, adhesions, and visual impairment. These conditions can be excluded by clinical records and/or medical history, and such conditions can be confirmed by complete absence of pupillary light reflex.
3: Once such conditions are excluded, if the patient had undergone prior baseline PUAL measurements (before opioid was administered) these may provide additional context (see the OPDESS Decline Scale).
4: For an OPDESS score=3, and a patient reporting significant pain, it is reasonable to consider non-opioid analgesic measures not previously utilized. However, if pain is successfully mitigated in a patient with an OPDESS score=3, that patient may have greater risk of OIRD since the patient would lack any existing ventilatory stimulation that was antagonizing the ventilatory depressant effect of opioid prior to resolution of pain by an alternative means (for instance, regional nerve block, ketamine, NSAID).
5: In the patient endorsing significant pain with an OPDESS score=3, consideration must be given to severe unrecognized pathologic conditions (i.e., acute abdomen, bone fracture, pneumothorax, myocardial ischemia, non-functioning neuraxial anesthesia, etc.).

For the patient with an OPDESS score=3 who does not report or exhibit signs of pain, the clinician can consider intensification of monitoring and support, and curtailing further opioid treatment until PUAL begins to recover and/or the patient begins to report pain or develop signs of pain or opioid withdrawal (if applicable).

For the patient with an OPDESS score=2, the clinician can consider the following:
1: Take serial PUAL measurements, implement frequent or continuous cardiopulmonary monitoring for hospitalized patients, and implement more intensive monitoring and support if the patient exhibits surrogate clinical signs consistent with excessive opioid effect (pruritis, somnolence, hypercapnia, slow ventilatory rate).
2: Compare the current PUAL to a baseline (previous) measurement taken when the patient was not hospitalized or receiving opioid in the outpatient setting, if available. Certain specifics and guidelines for use of this scale in certain situations ("Relative OPDESS") are provided in Example 4.

Example 4—an Alternative Scale for Interpretation of PUAL Denoted "Relative OPDESS"

Relative OPDESS is calculated by the proportional decline in PUAL compared to the patient's baseline (pre-medicated) PUAL. This scale provides excellent discrimination between low to moderate risk opioid exposure versus high-risk exposure, with an AUROC=0.9208 (0.8892, 0.9542). From the volunteer study, high-risk periods were considered to be 5, 7.5, 10 and 12.5 minutes from start of the 10-minute remifentanil infusion, bracketing the period during which all episodes of apnea and oxyhemoglobin desaturation were observed, when average estimated remifentanil effect site concentrations ranged from 2.7(0.4) to 4.9(0.7) ng/mL. In contrast, low to moderate risk periods were 2.5, 22.5, and 25 minutes from start of the remifentanil infusion, when average estimated remifentanil blood and effect site concentrations ranged from 0.5(0.1)–1.6(0.2) ng/mL, periods during which no apnea or oxyhemoglobin desaturation was observed. This scale may be considered when a patient's PUAL falls into an indeterminant range (>0.04 but <0.14), or when alternative technologies become available for clinical use that might employ different sampling rates or methods of PUAL computation, where proportional changes will remain consistent across methods.

The use of various cut-off points may be considered depending upon the clinical circumstances. The more common risk may be failure to detect significant PUAL decline and, therefore, a lower cutoff might be chosen. For the Relative OPDESS scale, the highest correct classification was observed with a PUAL decline of 75% or more from the baseline value, providing 88.12% sensitivity and 80.83% specificity for correctly identifying high-risk opioid exposure. However, a "baseline" PUAL may have several limitations. For example, if that "baseline" was obtained while the patient was exposed to opioid or other conditions that temporarily caused PUAL suppression, the Relative OPDESS scale would be less reliable. Therefore, "baseline" PUAL should be confirmed to be the true "baseline" PUAL, i.e., without any effect from factors that affect PUAL.

In summary, although OPDESS is a valuable addition to the care of the opioid treated patient, in certain instances, low values may not specific for opioid toxicity and may require interpretation by a physician. A previous normal value however does essentially eliminate these concerns.

Example 5—Selecting Absolute PUAL Value or Relative OPDESS for Determining the Risk of Opioid Related Adverse Event and Use of Different Pupillometers For patients who are admitted to the hospital for reasons that may require opioid administration, for example, for elective surgery, a baseline PUAL on admission would be determined as a reference. Thereafter, when the patient receives opioid medication for pain management, the patient's PUAL could be compared to his or her baseline using the relative OPDESS scale.

If the subject's opioid status is unclear, or the subject uses opioid at baseline, then the scale using absolute PUAL values, either as a raw number or as a Z-score referencing the mean and standard deviation of the appropriate population, can be employed.

Pupillometers can be developed that can employ measurement frequencies and light characteristics that differ from those of the instrument used to develop this protocol. These developments may result in PUAL values that differ from those we have referenced in our absolute OPDESS scale. Therefore, three approaches are proposed to mitigate possible inconsistencies:
1: Transformation of raw PUAL values to Z-scores, using population mean and standard deviation. In this case, the baseline values are used that are derived from our healthy, opioid-naïve volunteer population prior to administration of opioid (0.26±0.10). In the future, sub-populations with comorbid conditions and at the extremes of age may be found to have slightly different mean and standard deviation, which can allow the score to be better calibrated to specific groups of individuals.
2: Evaluation of PUAL in real time and with calculation of proportional to decline from a known baseline value, taken when the patient has not been exposed to opioid.
3: Development of conversion factors that can establish equivalency of PUAL measurements between instruments. Once equivalent measurements are determined, this same risk assessment first described in this document can be used with alternative devices and technologies.

REFERENCES

1. Centers for Disease Control and Prevention (2018). *Drug overdose death rates, by drug type, sex, age, race, and Hispanic origin: United States, selected years* 1999-2017. Retrieved Dec. 18, 2019 from world-wide-website: cdc.gov/nchs/data/hus/2018/008.pdf.
2. Danovitch I, Vanle B, Van Groningen N, Ishak W, Nuckols T (2020) Opioid overdose in the hospital setting: A Systematic Review. J Addict Med 14: 39-47.
3. Overdyk F J, Dowling O, Marino J, Qiu J, Chien H-L, Erslon M, Morrison N, Harrison B, Dahan A, and Gan T J (2016) Association of opioids and sedatives with increased risk of in-hospital cardiopulmonary arrest from an administrative database. PLoS ONE 11(2): e0150214. https://doi.org/10.1371/journal.pone.0150214.
4. Lee L A, Caplan R A, Stephens L S, Posner K L, Terman G W, Voepel-Lewis T, Domino K B (2015) Postoperative opioid-induced respiratory depression: a closed claims analysis. *Anesthesiology* 122: 659-65.
5. Khanna A K, Hoppe P, Saugel B (2019) Automated continuous noninvasive ward monitoring: future directions and challenges. Crit Care 23(1):194-9. doi: 10.1186/s13054-019-2485-7.
6. Kharasch E D, Hoffer C, Walker A, Sheffels P (2003) Disposition and miotic effects of oral alfentanil: a potential noninvasive probe for first-pass cytochrome P4503A activity. Clin Pharmacol Ther 73: 199-208.
7. Rollins M D, Feiner J R, Lee J M, Shah S, Larson M (2015) Pupillary effects of high-dose opioid quantified with infrared pupillometry. Anesthesiology 121: 1037-44.
8. Montana M C, Juriga L, Sharma A, Kharasch E D (2019) Opioid sensitivity in children with and without obstructive sleep apnea. Anesthesiology 130: 936-45.
9. Usui S, Stark L (1982) A model for nonlinear stochastic behavior of the pupil. Biol Cybern 45: 13-21.
10. Stark L (1969) Pupillary control system: its nonlinear adaptive and stochastic engineering design characteristics. Fed Proc 28: 52-64.
11. Bokoch M P, Behrends M, Neice A, Larson M D (2015) Fentanyl, an agonist at the μ-opioid receptor, depresses pupillary unrest. Auton Neurosci 189: 68-74.
12. Neice A E, Behrends M, Bokoch M P, Seligman K M, Conrad N M, Larson M D (2017) Prediction of opioid analgesic efficacy by measurement of pupillary unrest. Anesth Analg 124: 915-21.
13. Turnbull P R K, Irani N, Lim N, and Phillips J R (2017) Origins of pupillary hippus in the autonomic nervous system. Investigative Ophthalmology and Visual Science 58: 197-203.
14. McKay R E, Neice A E, and Larson M D (2018) Pupillary unrest in ambient light and prediction of opioid responsiveness: Case report on its utility in the management of two patients with challenging acute pain conditions. Anesth Analg Practice 10: 279-82.
15. Wilhelm B, Giedke H, Ludtke H, Bittner E, Hofmann A, Wilhelm H (2001) Daytime variations in central nervous system activation measured by a pupillographic sleepiness test. J Sleep Res 10: 1-7.
16. Behrends M, Larson M D, Neice A E, Bokoch M P (2019) Suppression of pupillary unrest by general anesthesia and propofol sedation. J Clin Monit Comput 33: 317-323.
17. Smith J D, Masek G A, Ichonose L Y, Watanabe T and Stark L (1970) Single neuron activity in the pupillary system. Brain Research 24: 219-34.
18. Joshi S, Li Y, Kalwani R M, Gold J I (2016) Relationships between pupil diameter and neuronal activity in the locus coeruleus, colliculi, and cingulate cortex. Neuron 89: 221-34.
19. Kobelt P, Burke K, Renker P (2014) Evaluation of a standardized sedation assessment for opioid administration in the post anesthesia care unit. Pain Manag Nurs 15: 672-81.
20. Lang E, Kaplia A, Shlugman D, Hoke J F, Sebel P S (1996) Reduction of isoflurane minimal alveolar concentration by remifentanil. Anesthesiology 85: 721-8.
21. Olofsen E, Boom M, Niewenhuijs D, Sarton E, Teppema L, Aarts L, Dahan A (2010) Modeling the non-steady state respiratory effects of remifentanil in awake and propofol-sedated healthy volunteers. Anesthesiology 112: 1382-95.

22. Minto C F, Schnider T W, and Shafer S L (1997) Pharmacokinetics and pharmacodynamics of remifentanil. II. Model application. Anesthesiology 86: 24-43.
23. Egan T D, Lemmens H J M, Fiset P, Hermann D J, Muir K T, Stansky D J, and Shafer S L (1993) The pharmacokinetics of the new short-acting opioid remifentanil (G187084B) in healthy adult male volunteers. Anesthesiology 79: 881-93.
24. Hanks G W, Twycross R G, Lloyd J W (1981) Unexpected complication of successful nerve block. Morphine induced respiratory depression precipitated by removal of severe pain. Anaesthesia 36: 37-9.
25. Borghjerg F, Nielsen K, Franks J (1996) Experimental pain stimulates respiration and attenuates morphine-induced respiratory depression: a controlled study in human volunteers. Pain 64: 123-8.
26. Lentschener C, Tostivint P, White P, Gentili M E, and Ozier Y (2007) Opioid-induced sedation in the postanesthesia care unit does not insure adequate pain relief: a case-control study. Anesth Analg 105: 1193-7.
27. Janneto P J, Bratanow N C (2010) Pharmacogenomic considerations in the opioid management of pain. Genomic Medicine 2(9): 66-70.
28. Marateb H R, Mansourian M, Adibi P, Farina D (2014) Manipulating measurement scales in medical statistical analysis and data mining: A review of methodologies. J Res Med Sci 19: 47-56.
29. Murray R B, Adler M W, Korczyn A D (1983) The pupillary effects of opioids. Life Sci 33: 495-509.
30. Larson M D (2008) Mechanism of opioid-induced pupillary effects. Clinical Neurophysiology 119: 1358-64.
31. Charier D, Vogler M-C, Zantour D, Pichot V, Martins-Baltar A, Courbon M, Roche F, Vassal F, and Molliex S (2019) Assessing pain in the postoperative period: Anesthesia Nociception Index versus pupillometry. British Journal of Anaesthesia 123: e322-e327.

Accordingly, the preceding merely illustrates the principles of the present disclosure. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein.

We claim:

1. A method for determining in a subject the risk of an opioid-related adverse event, the method comprising:
    (a) determining in the subject pupillary unrest in ambient light (PUAL), wherein determining PUAL comprises using a portable electronic device equipped with a software programmed to measure PUAL and fitted with an adapter that engages at one end with an infrared camera on the portable electronic device and engages at the other end with an eye of the subject to facilitate the software on the portable electronic device to determine PUAL in a subject;
    (b) obtaining one or more of: a no risk threshold value of PUAL, a low risk threshold value of PUAL, a moderate risk threshold value of PUAL, a high-risk threshold value of PUAL, and a profound risk threshold value of PUAL; and
    (c) identifying the subject as having:
        i) no risk of the opioid-related adverse event if the PUAL in the subject is higher than the no risk threshold value of PUAL,
        ii) low risk of the opioid-related adverse event if the PUAL in the subject is higher than the low risk threshold value of PUAL but lower than the no risk threshold value of PUAL,
        iii) moderate risk of the opioid-related adverse event if the PUAL in the subject is higher than the moderate risk threshold value of PUAL but lower than the low risk threshold value of PUAL,
        iv) high risk of the opioid-related adverse event if the PUAL in the subject is higher than the high-risk threshold value of PUAL but lower than the moderate risk threshold value of PUAL, or
        v) profound risk of the opioid-related adverse event if the PUAL in the subject is lower than the profound risk threshold value of PUAL.

2. The method of claim 1, wherein determining PUAL comprises: obtaining a 5 to 20 second video of the pupil by an infrared camera, measuring the pupil diameter about 30 times per second, and deconstructing a waveform with fast Fourier Transform analysis, at frequency bands between 0.3-3 Hz.

3. The method of claim 1, wherein the adapter is substantially cylindrical or cone shaped with one end designed to be connected or placed on to the camera of the portable electronic device and the other end designed to be placed on the eye of a subject.

4. The method of claim 3, wherein the adapter is black or dark colored.

5. The method of claim 1, wherein:
    (a) the no risk threshold of PUAL is about 0.19;
    (b) the low risk threshold of PUAL is about 0.15;
    (c) the moderate risk threshold of PUAL is about 0.10;
    (d) the high-risk threshold of PUAL is about 0.05; and
    (e) the profound risk threshold of PUAL is about 0.04.

6. The method of claim 1, wherein the opioid-related adverse event is one or more of: mild pruritus/dermatitis, respiratory depression, gastrointestinal complications, central nervous system complications, and acute respiratory failure requiring mechanical ventilation.

7. The method of claim 1, further comprising administering appropriate therapy to the subject based on the determined level of risk of the opioid-related adverse event.

8. The method of claim 7, comprising administering an opioid to a subject suffering from pain and identified as having less than moderate risk of the opioid-related adverse event and, optionally, further monitoring PUAL intermittently to continuously assess the risk of the opioid-related adverse event.

9. The method of claim 7, comprising administering a pain medication other than an opioid to a subject suffering from pain and identified as having high risk or profound risk of the opioid-related adverse event.

10. The method of claim 7, comprising monitoring the subject identified as having high risk or profound risk of the opioid-related adverse event.

11. The method of claim 7, comprising providing personal interactions and/or interactive activities to keep stimulated and engaged the subject identified as having high risk or profound risk of the opioid-related adverse event.

12. A computer-implemented method for determining in a subject the risk of an opioid-related adverse event, the method comprising:
(a) determining, via one or more processors, in the subject pupillary unrest in ambient light (PUAL);
(b) obtaining, via one or more processors, one or more of: a no risk threshold value of PUAL, a low risk threshold value of PUAL, a moderate risk threshold value of PUAL, a high-risk threshold value of PUAL, and a profound risk threshold value of PUAL; and
(c) identifying, via one or more processors, the subject as having:
  i) no risk of the opioid-related adverse event if the PUAL in the subject is higher than the no risk threshold value of PUAL,
  ii) low risk of the opioid-related adverse event if the PUAL in the subject is higher than the low risk threshold value of PUAL but lower than the no risk threshold value of PUAL,
  iii) moderate risk of the opioid-related adverse event if the PUAL in the subject is higher than the moderate risk threshold value of PUAL but lower than the low risk threshold value of PUAL,
  iv) high risk of the opioid-related adverse event if the PUAL in the subject is higher than the high-risk threshold value of PUAL but lower than the moderate risk threshold value of PUAL, or
  v) profound risk of the opioid-related adverse event if the PUAL in the subject is lower than the profound risk threshold value of PUAL.

13. The computer-implemented method of claim 12, wherein determining PUAL, via one or more processors, comprises: obtaining, via one or more processors, a 5 to 20 second video of the pupil by an infrared camera, measuring, via one or more processors, the pupil diameter about 30 times per second, and deconstructing, via one or more processors, a waveform with fast Fourier Transform analysis, at frequency bands between 0.3-3 Hz.

14. The computer-implemented method of claim 12, wherein determining PUAL, via one or more processors, comprises activating a portable electronic device equipped with a software programmed to measure PUAL and fitted with an adapter that engages at one end with an infrared camera on the portable electronic device and engages at the other end with an eye of the subject to facilitate the software on the portable electronic device to determine PUAL in a subject.

15. The computer-implemented method of claim 14, wherein the adapter is substantially cylindrical or cone shaped with one end designed to be connected or placed on to the camera of the portable electronic device and the other end designed to be placed on the eye of a subject.

16. The computer-implemented method of claim 15, wherein the adapter is black or dark colored.

17. The computer-implemented claim 12, wherein:
(a) the no risk threshold of PUAL is about 0.19;
(b) the low risk threshold of PUAL is about 0.15;
(c) the moderate risk threshold of PUAL is about 0.10;
(d) the high-risk threshold of PUAL is about 0.05; and
(e) the profound risk threshold of PUAL is about 0.04.

18. The computer-implemented method of claim 12, wherein the opioid-related adverse event is one or more of: mild pruritus/dermatitis, respiratory depression, gastrointestinal complications, central nervous system complications, and acute respiratory failure requiring mechanical ventilation.

19. The computer-implemented method of claim 12, further comprising recommending, via one or more processors, an appropriate therapy to the subject based on the determined level of risk of the opioid-related adverse event.

20. The computer-implemented method of claim 19, comprising recommending, via one or more processors, administering an opioid to a subject suffering from pain and identified as having less than moderate risk of the opioid-related adverse event and, optionally, further recommending, via one or more processors, monitoring PUAL intermittently to continuously assess the risk of the opioid-related adverse event.

21. The computer-implemented method of claim 19, comprising recommending, via one or more processors, administering a pain medication other than an opioid to a subject suffering from pain and identified as having high risk or profound risk of the opioid-related adverse event.

22. The computer-implemented method of claim 19, comprising recommending, via one or more processors, monitoring a subject identified as having high risk or profound risk of the opioid-related adverse event.

23. The computer-implemented method of claim 19, comprising recommending, via one or more processors, providing personal interactions and/or interactive activities to keep stimulated and engaged a subject identified as having high risk or profound risk of the opioid-related adverse event.

* * * * *